United States Patent
Ma et al.

(10) Patent No.: US 11,591,465 B2
(45) Date of Patent: Feb. 28, 2023

(54) POLYESTER COMPOSITES AND THEIR PREPARATION METHODS

(71) Applicant: Jiangnan University, Wuxi (CN)

(72) Inventors: Piming Ma, Wuxi (CN); Baogou Wu, Wuxi (CN); Ying Cao, Wuxi (CN); Pengwu Xu, Wuxi (CN); Deyu Niu, Wuxi (CN); Weijun Yang, Wuxi (CN); Weifu Dong, Wuxi (CN); Mingqing Chen, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 400 days.

(21) Appl. No.: 16/886,869

(22) Filed: May 29, 2020

(65) Prior Publication Data

US 2020/0325328 A1 Oct. 15, 2020

Related U.S. Application Data

(63) Continuation of application No. PCT/CN2018/118179, filed on Nov. 29, 2018.

(30) Foreign Application Priority Data

| Dec. 1, 2017 | (CN) | 201711251368.5 |
| Dec. 1, 2017 | (CN) | 201711252299.X |
| Nov. 13, 2018 | (CN) | 201811344797.1 |
| Nov. 13, 2018 | (CN) | 201811345199.6 |
| Nov. 13, 2018 | (CN) | 201811345231.0 |

(51) Int. Cl.
*C08L 67/02* (2006.01)
*C08J 3/20* (2006.01)

(52) U.S. Cl.
CPC .............. *C08L 67/02* (2013.01); *C08J 3/203* (2013.01); *C08L 2203/12* (2013.01); *C08L 2203/20* (2013.01); *C08L 2205/025* (2013.01); *C08L 2205/03* (2013.01); *C08L 2207/20* (2013.01)

(58) Field of Classification Search
None
See application file for complete search history.

(56) References Cited

U.S. PATENT DOCUMENTS

| 4,962,148 A * | 10/1990 | Orikasa | C08L 23/12 |
| | | | 524/436 |
| 5,302,645 A * | 4/1994 | Nakano | C08K 5/527 |
| | | | 524/508 |
| 2012/0244333 A1* | 9/2012 | Aksay | D01F 2/00 |
| | | | 428/221 |
| 2018/0112056 A1* | 4/2018 | Yang | C08F 8/42 |
| 2021/0032402 A1* | 2/2021 | Okunaga | C08G 59/32 |

FOREIGN PATENT DOCUMENTS

| CN | 101845205 A | 9/2010 |
| CN | 102417697 A | 4/2012 |
| CN | 104497500 A | 4/2015 |
| CN | 105199338 A | 12/2015 |
| CN | 105694438 | * 12/2018 |
| KR | 20170063159 A | 6/2017 |
| WO | 2016179770 A1 | 11/2016 |

OTHER PUBLICATIONS

Datasheet for KH-560.*
Machine translation of Xie et al. CN 105694438 (Year: 2018).*
PCT/CN2018/118179 ISR Mail Date Mar. 6, 2019.

* cited by examiner

*Primary Examiner* — Robert T Butcher
(74) *Attorney, Agent, or Firm* — IPro, PLLC; Na Xu

(57) ABSTRACT

The present disclosure discloses polyester composites and their preparation methods, and belongs to the technical field of polymer processing and modification. The polyester composites of the present disclosure comprise 65 to 90 parts of polyester, 5 to 35 parts of an elastomer, 0.05 to 3 parts of a chain extender and 0.01 to 5 parts of a functional additive. The polyester composites of the present disclosure not only have ultra-high toughness, but also can maintain high tensile strength, have excellent hydrolysis resistance, can be matched with an antibacterial agent or an antistatic agent to have good antibacterial or antistatic additional functions, can be widely applied to the fields of fibers and fabrics, plastic structural parts, plastic packages or automobile interior parts, and have a wide prospect.

17 Claims, No Drawings

POLYESTER COMPOSITES AND THEIR PREPARATION METHODS

TECHNICAL FIELD

The present disclosure relates to polyester composites and their preparation methods, and belongs to the technical field of polymer processing and modification.

BACKGROUND

Poly(butylene terephthalate) (PBT) and poly(ethylene terephthalate) (PET) plastics are two major commonly used polyester materials. Due to high strength, fatigue resistance, stable size, small creep, heat aging resistance and good processing performance, PBT and PET plastics are widely applied to the fields of automobiles, electronic appliances, industrial machines and the like. However, PBT and PET also have obvious disadvantages, such as sensitivity to notching and low notched impact strength, which are the main disadvantages of PBT and the PET as engineering plastics, and insufficient toughness also becomes a major obstacle for popularization and application. Therefore, the research on toughening modification of PBT and the PET has been important content of high performance of PBT and PET. Melt blending with functionalized elastomers is a simple, economical and effective method of improving polyester toughness. The toughening efficiency is improved because functional groups on the functionalized elastomers react with end groups (carboxyl or hydroxyl) on polyester to achieve in-situ compatibilization. In the patent CN201410779308 and 'Preparation and Characterization of Low-mold-temperature Glass Fiber Reinforced PET Composites', a functional elastomer ethylene-n-butyl acrylate-glycidyl methacrylate copolymer was used to modify the polyester, and in 'Effect of Hollow Glass Microspheres Content on Properties of Recycled Polyethylene terephthalate/Polycarbonate Composite Foam Materials', an ethylene-methyl acrylate-glycidyl methacrylate copolymer was used to toughen the PET. However, the notched impact strength of polyester materials obtained by the above preparation methods can still not meet some products with higher application requirements, and the addition of the elastomers can obviously reduce the tensile strength of the polyester materials. Meanwhile, the polyester materials such as PBT are often not resistant to hydrolysis due to the existence of end carboxyl groups, end hydroxyl groups and a large quantity of ester bonds, so that the polyester materials are difficult to apply in environments with high humidity.

Elastomers are typically dispersed as spherical particles in a polyester matrix to form a general sea-island structure, of which the toughening efficiency tends to be less than 'bicontinuous' or 'quasi-bicontinuous' phase morphology. Therefore, the transformation of phase morphology of polyester/elastomer blended materials from the sea-island structure to a bicontinuous phase structure is the key to further improve the toughening efficiency.

In addition, with the rapid development of economy, people have increasing requirements for additional functions of materials, such as antibacterial, antistatic and other functional properties. In the aspect of antibacterial functional property, people can improve the antibacterial property of the materials by adding ZnO into the PBT materials, for example, in the patent CN102838852A, a composite antibacterial agent containing zinc oxide is added into the PBT materials to endow the materials with the antibacterial property, however, in the process of melt processing, the addition of the zinc oxide can catalyze the thermal degradation of PBT, so that the toughness of the materials is remarkably reduced, and the application of the PBT materials is limited. In addition, the polyester materials used in the fields of electric appliance housings and the like are likely to accumulate electric charges on the surfaces in the use process, especially in a low-humidity environment, and can release static electricity under certain conditions to cause damage to human bodies and electric appliances. The patent CN102675836A invents a conductive/antistatic polyester PET composite, but the addition quantity of carbon nanotubes is large, and the preparation process is complicated, which is not conducive to industrial production. Therefore, it will be highly desirable to invent a composite with stable toughness and better additional functions.

SUMMARY

In view of the defects in the prior art, the present disclosure provides polyester composites, while in-situ reaction compatibilization with elastomers is ensured, phase morphology of blended materials is made to change from a common sea-island structure to a quasi-bicontinuous structure, the super-tough polyester composites are obtained, and relatively high tensile strength is also kept. In addition, a composition provided by the present disclosure also has excellent hydrolysis resistance, and can be widely applied to the fields of plastic structural parts, plastic packages or automobile interior parts.

According to the polyester composites provided by the present disclosure, polyester and the elastomers are firstly subjected to melt blending, functional groups on the elastomers and end groups (carboxyl or hydroxyl) of the polyester fully react with each other, and in-situ reaction compatibilization is realized; and then a chain extender is added for continuing to perform melt blending to expand a molecular weight of the polyester, so that the viscosity of a polyester matrix is improved, the elastomers are changed from an original disperse phase to a quasi-continuous phase to form a quasi-bicontinuous structure, and accordingly the toughening effect of the elastomers on the polyester is further improved. In addition, as the molecular weight of the polyester matrix increases, the tensile strength of a blend is also significantly improved. As the functionalized elastomers and the chain extender react with the end groups of the polyester, a large quantity of end carboxyl groups and end hydroxyl groups are consumed, thereby also significantly improving the hydrolysis resistance of the composition.

A first objective of the present disclosure is to provide a polyester composite or an engineering plastic composition, a formula of the composite or the composition includes, in parts by weight: 65 to 90 parts of polyester, 5 to 35 parts of an elastomer, 0.05 to 3 parts of a chain extender and 0.01 to 5 parts of a functional additive;

a preparation method of the polyester composite includes:

uniformly mixing the polyester, the elastomer and the functional additive in parts by weight, then performing melt extrusion, adding the chain extender in parts by weight, and then performing melt extrusion to obtain the polyester composite;

or, uniformly mixing the polyester, the elastomer and the functional additive according to the weight ratio, then performing melt blending, adding the chain extender according to the weight ratio, and then performing melt blending to obtain the composite.

The chain extender is added in the process of melt extrusion or melt blending of polyester and elastomer, then performing continuous melt extrusion or melt blending; or, the chain extender is added after melt extrusion or melt blending of polyester and elastomer, then performing melt extrusion or melt blending.

the elastomer containing epoxy groups or anhydride groups contains a structural units of vinyl acetate.

In one embodiment of the present disclosure, the polyester includes at least one of PET, PBT and polycarbonate (PC).

In one embodiment of the present disclosure, intrinsic viscosity of the polyester is 0.3 to 1.5 dL/g.

In one embodiment of the present disclosure, the chain extender includes at least one of a compound containing a plurality of epoxy groups, a compound containing a plurality of isocyanate groups and an anhydride compound.

In one embodiment of the present disclosure, the functional additive includes at least one of an antioxidant, a lubricant, a nucleating agent, an anti-hydrolysis agent and a transesterification inhibitor.

In one embodiment of the present disclosure, the antioxidant includes at least one of pentaerythritol tetrakis[β-(3,5-di-tert-butyl-4-hydroxyphenyl)propionate], tris[2,4-di-tert-butylphenyl]phosphite, and n-octadecanol β-(3,5-di-tert-butyl-4-hydroxyphenyl)propionate.

In one embodiment of the present disclosure, the lubricant includes at least one of solid paraffin, liquid paraffin, polyethylene wax, stearamide, methylene bis stearamide, N,N-ethylene bis stearamide and pentaerythritol stearate.

In one embodiment of the present disclosure, the nucleating agent includes at least one of talc, magnesium stearate, sodium benzoate and Surlyn 8920.

In one embodiment of the present disclosure, the anti-hydrolysis agent includes N,N'-di(2,6-diisopropylphenyl) carbodiimide; and the transesterification inhibitor is at least one of sodium dihydrogen phosphate, triphenyl phosphite and disodium dihydrogen pyrophosphate.

In one embodiment of the present disclosure, the preparation method of the composition specifically includes:

uniformly premixing the polyester, the elastomer and the functional additive according to a weight ratio to obtain a premix, adding the premix into a conveying section of a double-screw extruder through a main feeding port, adding the chain extender into the middle of a meshing section of the double-screw extruder through side feeding according to the weight ratio, and performing continuous melt extrusion to obtain a composite, wherein a melt extrusion temperature is 1 to 30° C. above a melting point of the polyester, and a rotation speed of screws is 100 to 350 rpm;

or, adding the polyester, the elastomer and the functional additive into an internal mixer according to a weight ratio for melt blending for 2 to 5 minutes, and then adding the chain extender for continuing to blend for 1 to 5 minutes to obtain the engineering plastic composition, wherein a melt blending temperature is 1 to 30° C. above the melting point of the polyester.

In one embodiment of the present disclosure, when PBT is used as the polyester, the composite further includes 0.1 to 4 parts of an antibacterial agent, and the antibacterial agent includes one or more of zinc oxide, silver oxide, titanium dioxide and cerium oxide.

In one embodiment of the present disclosure, the preparation method of the composite includes:

uniformly mixing the PBT, the elastomer and the antibacterial agent according to a weight ratio, then performing extrusion, adding the chain extender according to the weight ratio, and performing continuous melt extrusion to obtain the composite;

or, uniformly mixing the PBT, the elastomer and the antibacterial agent according to the weight ratio, performing melt blending, and then adding the chain extender according to the weight ratio for continuing to blend to obtain the composite.

In one embodiment of the present disclosure, the melt blending temperature is 1 to 30° C. above the melting point of the polyester.

A second objective of the present disclosure is to provide a PBT composite, a formula of the composite includes, in parts by weight: 65 to 90 parts of PBT, 5 to 35 parts of a vinyl acetate-based copolymer, 0 to 4 parts of an antibacterial agent and 0 to 3 parts of a chain extender; and the antibacterial agent includes one or more of zinc oxide, silver oxide, titanium dioxide and cerium oxide.

In one embodiment of the present disclosure, a formula of the composite includes, in parts by weight: 65 to 90 parts of the PBT, 5 to 35 parts of the vinyl acetate-based copolymer, 0.1 to 4 parts of the antibacterial agent, 0.05 to 3 parts of the chain extender and 0.01 to 5 parts of a functional additive.

In one embodiment of the present disclosure, a preparation method of the composite includes: uniformly mixing the PBT, the vinyl acetate-based copolymer and the antibacterial agent according to a weight ratio, then performing extrusion, adding the chain extender according to a weight ratio, and then performing continuous melt extrusion to obtain the composite;

or, uniformly mixing the PBT, the vinyl acetate-based copolymer and the antibacterial agent according to the weight ratio, performing melt blending, and then adding the chain extender according to the weight ratio for continuing to blend to obtain the composite.

In one embodiment of the present disclosure, the preparation method of the composite specifically includes:

uniformly premixing the PBT, the vinyl acetate-based copolymer and the antibacterial agent at a room temperature according to the weight ratio to obtain a premix, adding the premix into a conveying section of a double-screw extruder through a main feeding port, adding the chain extender into the middle of a meshing section of the double-screw extruder through side feeding, and performing continuous melt extrusion to obtain the composite;

or, uniformly premixing the PBT, the vinyl acetate-based copolymer and the antibacterial agent at a room temperature according to the weight ratio to obtain a premix, adding the premix into an internal mixer for melt blending for 2 to 5 minutes, and then adding the chain extender for continuing to blend for 1 to 5 minutes to obtain the composite.

In one embodiment of the present disclosure, a melt blending temperature is 1 to 30° C. above a melting point of the PBT and a rotation speed of screws is 100 to 350 rpm.

In one embodiment of the present disclosure, a formula of the composite includes, in parts by weight: 65 to 90 parts of the PBT, 5 to 35 parts of the vinyl acetate-based copolymer, 0.1 to 5 parts of epoxidized carbon-based particles, 0.05 to 3 parts of the chain extender and 0.01 to 5 parts of the functional additive.

In one embodiment of the present disclosure, the preparation method of the composite includes: uniformly mixing the PBT, the epoxidized carbon-based particles and the functional additive according to a weight ratio, then performing melt extrusion, adding the vinyl acetate-based copolymer according to a weight ratio, then performing melt extrusion, finally adding the chain extender according to the weight ratio, and continuing to perform melt extrusion to obtain the composite;

or, uniformly mixing the PBT, the epoxidized carbon-based particles and the functional additive according to the weight ratio, then performing melt blending, adding the vinyl acetate-based copolymer according to the weight ratio, then performing melt blending, finally adding the chain extender according to the weight ratio, and continuing to perform melt blending to obtain the composite.

In one embodiment of the present disclosure, the preparation method of the composite specifically includes:

uniformly premixing the PBT, the epoxidized carbon-based particles and the functional additive according to the weight ratio to obtain a premix, adding the premix into a conveying section of a double-screw extruder through a main feeding port, adding the vinyl acetate-based copolymer into the double-screw extruder through first side feeding according to the weight ratio for melt blending, and adding the chain extender into the double-screw extruder through second side feeding according to the weight ratio for continuous melt extrusion to obtain the composite, wherein a melt extrusion temperature is 1 to 30° C. above the melting point of the PBT, and the rotation speed of the screws is 100 to 350 rpm;

or, adding the PBT, the epoxidized carbon-based particles and the functional additive into the internal mixer according to the weight ratio for melt blending for 1 to 3 minutes, then adding the vinyl acetate-based copolymer according to the weight ratio for continuing to blend for 1 to 4 minutes, and finally adding the chain extender according to the weight ratio for continuing to blend for 1 to 3 minutes to obtain the composite, wherein the melt blending temperature is 1 to 30° C. above the melting point of the PBT.

In one embodiment of the present disclosure, the formula of the composite includes, in parts by weight: 65 to 90 parts of the PBT, 5 to 35 parts of the vinyl acetate-based copolymer and 0.1 to 4 parts of epoxidized nano zinc oxide.

In one embodiment of the present disclosure, the vinyl acetate-based copolymer at least further contains glycidyl methacrylate and an ethylene structural unit.

In one embodiment of the present disclosure, the vinyl acetate-based copolymer includes 45 to 75% by mass of vinyl acetate and 0.5 to 10% by mass of the glycidyl methacrylate.

In one embodiment of the present disclosure, the vinyl acetate-based copolymer may further include an ethylene-vinyl acetate copolymer.

In one embodiment of the present disclosure, the ethylene-vinyl acetate copolymer includes 45 to 75% by mass of the vinyl acetate.

In one embodiment of the present disclosure, intrinsic viscosity of polyester is 0.3 to 1.5 dL/g.

In one embodiment of the present disclosure, a particle size of an antibacterial agent is a kind of nanoparticle with a particle size of 10 to 3000 nm.

In one embodiment of the present disclosure, the particle size of the antibacterial agent is preferably 10 to 300 nm.

In one embodiment of the present disclosure, the epoxidized carbon-based particles are at least one of epoxidized multi-wall carbon nanotubes, epoxidized graphene and epoxidized carbon black.

In one embodiment of the present disclosure, the epoxidized carbon-based particles have a diameter of 10 to 300 nm.

In one embodiment of the present disclosure, the functional additive includes at least one of an antioxidant, a lubricant, a nucleating agent, an anti-hydrolysis agent and a transesterification inhibitor.

In one embodiment of the present disclosure, the chain extender is at least one of a compound containing a plurality of epoxy groups, a compound containing a plurality of isocyanate groups and an anhydride compound.

In one embodiment of the present disclosure, the antioxidant is at least one of pentaerythritol tetrakis[β-(3,5-di-tert-butyl-4-hydroxyphenyl)propionate], tris[2,4-di-tert-butylphenyl]phosphite, and n-octadecanol β-(3,5-di-tert-butyl-4-hydroxyphenyl)propionate.

In one embodiment of the present disclosure, the lubricant is at least one of solid paraffin, liquid paraffin, polyethylene wax, stearamide, methylene bis stearamide, N,N-ethylene bis stearamide and pentaerythritol stearate.

In one embodiment of the present disclosure, the nucleating agent is at least one of talc, magnesium stearate, sodium benzoate and Surlyn 8920.

In one embodiment of the present disclosure, the melt blending temperature is 1 to 30° C. above the melting point of the PBT.

A third objective of the present disclosure is to provide a PET composite, wherein a formula of the composite includes, in parts by weight: 70 to 95 parts of recycled PET and 5 to 30 parts of a vinyl acetate-based copolymer, intrinsic viscosity of the recycled PET is 0.3 to 1.0 dL/g, and content of vinyl acetate in the vinyl acetate-based copolymer is 45 to 75% by mass.

In one embodiment of the present disclosure, the composite further includes 0.1 to 4 parts of epoxidized nano zinc oxide or 0.1 to 4 parts of nano zinc oxide.

In one embodiment of the present disclosure, the composite further includes 0.05 to 3 parts of a chain extender.

In one embodiment of the present disclosure, when the composite includes the epoxidized nano zinc oxide, a preparation method of the composite includes:

uniformly premixing the PET, the vinyl acetate-based copolymer and the epoxidized nano zinc oxide according to a weight ratio at a room temperature, and then performing melt extrusion through a double-screw extruder to obtain the composite, wherein a melt extrusion temperature is 1 to 30° C. above a melting point of the PET, and a rotation speed of screws is 100 to 350 rpm;

or, adding the PET, the vinyl acetate-based copolymer and the epoxidized nano zinc oxide into an internal mixer according to the weight ratio for melt blending for 3 to 10 minutes to obtain the composite, wherein a melt blending temperature is 1 to 30° C. above the melting point of the PET.

In one embodiment of the present disclosure, a surface of the epoxidized nano zinc oxide at least contains one epoxy group, and a preparation method of the epoxidized nano zinc oxide includes:

mixing the nano zinc oxide, a solvent and an epoxy compound according to a weight ratio of 5 to 15:65 to 85:2 to 30, reacting for 1 to 24 hours at 30 to 70° C., and purifying to obtain the epoxidized nano zinc oxide;

or, performing high-speed stirring treatment on the nano zinc oxide, the solvent and the epoxy compound according to a weight ratio of 80 to 99:0.5 to 20:0.5 to 5 for 2 to 10 minutes to obtain the epoxidized nano zinc oxide; and the solvent is at least one of water, methanol and ethanol.

In one embodiment of the present disclosure, the epoxy compound at least contains one —Si—O— group, and a particle size of the nano zinc oxide is 10 to 300 nm.

In one embodiment of the present disclosure, when the composite includes the nano zinc oxide, the preparation method of the composite includes:

uniformly premixing the PET, the vinyl acetate-based copolymer and the nano zinc oxide according to the weight ratio at the room temperature to obtain a premix, then adding the premix into a conveying section of the double-screw extruder through a main feeding port, adding the chain extender into the middle of the meshing section of the double-screw extruder through side feeding according to the weight ratio, and performing continuous melt extrusion to obtain a tough PET antibacterial composite, wherein the melt extrusion temperature is 1 to 30° C. above the melting point of the PET, and the rotation speed of the screws is 100 to 350 rpm;

or, adding the PET, the vinyl acetate-based copolymer and the nano zinc oxide into the internal mixer according to the weight ratio for melt blending for 2 to 5 minutes, and then adding the chain extender for continuing to blend for 1 to 5 minutes to obtain the tough PET antibacterial composite, wherein the melt blending temperature is 1 to 30° C. above the melting point of the PET.

In one embodiment of the present disclosure, the composite further includes 0.1 to 5 parts of epoxidized carbon-based particles, 0.01 to 5 parts of a functional additive and 0.05 to 3 parts of the chain extender.

In one embodiment of the present disclosure, the preparation method of the composite includes:

uniformly mixing the PET, the epoxidized carbon-based particles and the functional additive according to the weight ratio, then performing melt extrusion, adding the vinyl acetate-based copolymer according to the weight ratio, then performing melt extrusion, finally adding the chain extender according to the weight ratio, and continuing to perform melt extrusion to obtain the composite;

or, uniformly mixing the PET, the epoxidized carbon-based particles and the functional additive according to the weight ratio, then performing melt blending, adding the vinyl acetate-based copolymer according to the weight ratio, then performing melt blending, finally adding the chain extender according to the weight ratio, and continuing to perform melt blending to obtain the composite.

In one embodiment of the present disclosure, the preparation method of the composite specifically includes:

uniformly premixing the PET, the epoxidized carbon-based particles and the functional additive according to the weight ratio, adding the premix into the conveying section of the double-screw extruder through the main feeding port, adding the vinyl acetate-based copolymer into the double-screw extruder through first side feeding according to the weight ratio for melt blending, and adding the chain extender into the double-screw extruder through second side feeding according to the weight ratio for continuous melt extrusion to obtain the composite, wherein the melt extrusion temperature is 1 to 30° C. above the melting point of the PET, and the rotating speed of the screws is 100 to 350 rpm;

or, adding the PET, the epoxidized carbon-based particles and the functional additive into the internal mixer according to the weight ratio for melt blending for 1 to 3 minutes, then adding the vinyl acetate-based copolymer according to the weight ratio for continuing to blend for 1 to 4 minutes, and finally adding the chain extender according to the weight ratio for continuing to blend for 1 to 3 minutes to obtain the composite, wherein the melt blending temperature is 1 to 30° C. above the melting point of the PET.

In one embodiment of the present disclosure, the vinyl acetate-based copolymer at least further contains glycidyl methacrylate and an ethylene structural unit, wherein percentage content of the glycidyl methacrylate is 0.5 to 10% by mass.

In one embodiment of the present disclosure, the vinyl acetate-based copolymer may further include an ethylene-vinyl acetate copolymer. In one embodiment of the present disclosure, the epoxidized carbon-based particles are at least one of epoxidized multi-wall carbon nanotubes, epoxidized graphene and epoxidized carbon black.

In one embodiment of the present disclosure, the epoxidized carbon-based particles are modified with epoxy resin to epoxidize the carbon-based particles.

In one embodiment of the present disclosure, the epoxidized carbon-based particles have a diameter of 10 to 300 nm.

In one embodiment of the present disclosure, the chain extender includes at least one of a compound containing a plurality of epoxy groups, a compound containing a plurality of isocyanate groups and an anhydride compound.

In one embodiment of the present disclosure, the functional additive includes at least one of an antioxidant, a lubricant, a nucleating agent, an anti-hydrolysis agent and a transesterification inhibitor.

In one embodiment of the present disclosure, the antioxidant includes at least one of pentaerythritol tetrakis[β-(3,5-di-tert-butyl-4-hydroxyphenyl)propionate], tris[2,4-di-tert-butylphenyl]phosphite, and n-octadecanol β-(3,5-di-tert-butyl-4-hydroxyphenyl)propionate.

In one embodiment of the present disclosure, the lubricant includes at least one of solid paraffin, liquid paraffin, polyethylene wax, stearamide, methylene bis stearamide, N,N-ethylene bis stearamide and pentaerythritol stearate.

In one embodiment of the present disclosure, the nucleating agent includes at least one of talc, magnesium stearate, sodium benzoate and Surlyn 8920.

In one embodiment of the present disclosure, the anti-hydrolysis agent includes N,N'-di(2,6-diisopropylphenyl) carbodiimide; and the transesterification inhibitor is at least one of sodium dihydrogen phosphate, triphenyl phosphite and disodium dihydrogen pyrophosphate.

A fourth objective of the present disclosure is to provide a plastic package or a plastic structural part, and the plastic package or the plastic structural part includes the above composites.

A fifth objective of the present disclosure is to provide an automobile interior part, and the automobile interior part includes the above composites.

A sixth objective of the present disclosure is to provide an electric appliance housing, wherein the electric appliance housing includes the above composites.

A seventh objective of the present disclosure is to provide an antibacterial fiber or fabric, which includes the above composites.

The present disclosure has the following beneficial effects:

1. Because the vinyl acetate-based copolymer and the chain extender react with the end groups of the polyester in the polyester composites of the present disclosure, a large quantity of end carboxyl groups and end hydroxyl groups are consumed, so that the hydrolysis resistance of the composition is significantly improved.

2. According to the polyester composites disclosed by the present disclosure, the polyester and the elastomers are firstly subjected to melt blending, so that the full reaction between the functional groups on the elastomers and the end groups (carboxyl or hydroxyl) of the polyester is ensured, and in-situ reaction compatibilization is realized. Then the chain extender is added for continuing to perform melt blending to expand the molecular weight of the polyester, so that the viscosity of the polyester matrix is improved, the elastomers are changed from the original disperse phase to the quasi-continuous phase to form the quasi-bicontinuous structure, and the toughening effect of the elastomers on the polyester is further improved. In addition, as the molecular weight of the polyester matrix increases, the tensile strength of the composition is also significantly improved.

3. According to the polyester composites of the present disclosure, the polyester and the epoxidized carbon-based particles are firstly subjected to melt blending and then the elastomers are added for blending, so that the carbon-based particles are selectively distributed in the polyester matrix, the full reaction between the elastomers and the end groups of the polyester is ensured, and the in-situ reaction compatibilization is realized; and finally, the chain extender is added for continuing to perform melt blending to expand the molecular weight of the polyester, thereby improving the viscosity of the polyester matrix and remarkably reducing the particle size and the particle spacing of the elastomers, and further improving the toughening effect of the elastomers on the polyester; and meanwhile, the particle size and the particle spacing of the elastomers are reduced, so that the carbon-based particles selectively dispersed in the polyester matrix can form a network conductive structure more easily, and the conductivity of the polyester composites can reach the antistatic range, namely $10^{-11}$ to $10^{-4}$ S/cm, under the condition that the addition quantity of the carbon-based particles is very low.

4. According to the polyester composites of the present disclosure, by adding the metal oxide antibacterial agent and the chain extender, the antibacterial property of the composites is significantly improved, and the thermal degradation of the antibacterial agent to the polyester matrix can be compensated, so that the polyester composites keep high toughness.

5. According to the polyester composites of the present disclosure, due to the addition of the epoxidized nano zinc oxide, the antibacterial property of the composites is significantly improved, and the migration of the zinc oxide in the polyester matrix is effectively inhibited; and meanwhile, the epoxidized nano zinc oxide can also react with the polyester in situ, so that the degradation effect of the zinc oxide on the polyester is weakened, and the composites have excellent mechanical properties such as impact strength.

6. The preparation methods of the polyester composites are simple and efficient, industrial production is easy to realize and prospects are wide.

DETAILED DESCRIPTION

The present disclosure is described in detail below with reference to examples and comparative examples, but the examples should not limit the scope of the present disclosure.

The epoxidized carbon-based particles involved in the following examples are prepared by the following process:

The epoxidized carbon-based particles can be prepared by a solution method and a melting method.

For example:

Dispersing 0.5 g of acidified carbon nanotubes (MWCNT-COOH) in 30 ml of DMF, and sonicating for 30 min to obtain a uniform suspension. In another container, 10 g of epoxy resin (E51, CAS:61788-97-4) was dissolved in 30 ml of DMF to prepare a mixed solution. Mixing the prepared suspension with the mixed solution, adding triphenylphosphine (0.5% of epoxy resin mass) as a catalyst, and then sonicating for 0.5 h, then heating to 80° C. and stirring to react for 24 h; finally, waiting for the temperature to drop to room temperature, washing the functionalized carbon nanotubes with a large amount of dichloromethane, and performing vacuum suction filtration with a 0.22 μm nylon membrane to obtain epoxy-functionalized carbon nanotubes.

Replacing the acidified carbon nanoparticles with acidified graphene or carbon black respectively, correspondingly obtains epoxidized graphene and epoxidized carbon black.

Dispersing 0.5 g of acidified carbon nanotubes (MWCNT-COOH) in 10 g of epoxy resin (E51), stirring and heating to 80° C., adding catalyst triphenylphosphine (0.25% of epoxy resin mass), stirring and heating to 150° C., reacting for 24 hours; then then coolling the temperature to room temperature, washing the functionalized carbon nanotubes with a large amount of dichloromethane, and performing vacuum suction filtration with a 0.22 μm nylon membrane to obtain epoxy functionalization Of carbon nanotubes (MWCNT-E51).

In the same way, epoxy resin (E12) and carbon nanotubes are reacted to obtain epoxy functionalized carbon nanotubes.

Example 1

80 parts of PBT, 20 parts of an ethylene-vinyl acetate-glycidyl methacrylate copolymer and 0.3 parts of pentaerythritol tetrakis[β-(3,5-di-tert-butyl-4-hydroxyphenyl) propionate] were premixed uniformly at a room temperature to obtain a premix, then the premix was added into a conveying section of a double-screw extruder through a main feeding port, and 1 part of a chain extender ADR4370 (BASF Joncryl® ADR4370) was added into the middle of a meshing section of the double-screw extruder through side feeding, and a composite was obtained by continuous melt extrusion (with an extrusion temperature of 240° C. and a rotation speed of screws of 150 rpm).

Example 2

80 parts of PBT, 20 parts of an ethylene-vinyl acetate-glycidyl methacrylate copolymer, 0.2 parts of tris[2,4-di-tert-butylphenyl]phosphite and 0.2 parts of n-octadecanol β-(3,5-di-tert-butyl-4-hydroxyphenyl)propionate were premixed uniformly at a room temperature to obtain a premix, then the premix was added into a conveying section of a double-screw extruder through a main feeding port, and 0.8 part of a chain extender ADR4468 (BASF Joncryl® ADR4468) was added into the middle of a meshing section of the double-screw extruder through side feeding, and a composite was obtained by continuous melt extrusion (with an extrusion temperature of 255° C. and a rotation speed of screws of 180 rpm).

Example 3

75 parts of PBT, 10 parts of an ethylene-vinyl acetate-glycidyl methacrylate copolymer, 15 parts of an ethylene-vinyl acetate copolymer, 0.15 parts of pentaerythritol tetrakis[β-(3,5-di-tert-butyl-4-hydroxyphenyl)propionate], 0.15 parts of tris[2,4-di-tert-butylphenyl]phosphite, and 0.1 parts of solid paraffin were premixed uniformly at a room temperature to obtain a premix, then the premix was added into a conveying section of a double-screw extruder through a main feeding port, and 1.2 part of a chain extender a chain extender of hexamethylene diisocyanate was added into the middle of a meshing section of the double-screw extruder through side feeding, and a composite was obtained by continuous melt extrusion (with an extrusion temperature of 235° C. and a rotation speed of screws of 210 rpm).

Example 4

85 parts of PBT, 3 parts of an ethylene-vinyl acetate-glycidyl methacrylate copolymer, 12 parts of an ethylene-vinyl acetate copolymer, 0.2 parts of pentaerythritol tetrakis[β-(3,5-di-tert-butyl-4-hydroxyphenyl)propionate], 0.1 parts of polyethylene wax and 0.3 parts of sodium benzoate were added into an internal mixer for melt blending for 3 minutes, and then 1.3 parts of a chain extender of pyromellitic dianhydride was added for continuing to blend for 2 minutes (with a blending temperature of 260° C.) to prepare a composite.

Example 5

75 parts of PBT, 25 parts of an ethylene-vinyl acetate-glycidyl methacrylate copolymer, 0.4 parts of tris[2,4-di-tert-butylphenyl]phosphite, 0.2 parts of stearamide and 0.3 parts of magnesium stearate were added into an internal mixer for melt blending for 3 minutes, and then 0.7 parts of a chain extender ADR4468 (BASF Joncryl® ADR4468) was added for continuing to blend for 3 minutes (with a blending temperature of 240° C.) to prepare a composite.

Example 6

On the basis of Example 1, a polyester composite is prepared by replacing the ethylene-vinyl acetate-glycidyl methacrylate copolymer with an ethylene-n-butyl acrylate-glycidyl methacrylate copolymer with other components and conditions being identical with those of Example 1.

Comparative Example 1

Referring to Example 1, a composite is obtained without the addition of a functionalized elastomer and a chain extender: 100 parts of PBT and 0.3 parts of pentaerythritol tetrakis[β-(3,5-di-tert-butyl-4-hydroxyphenyl)propionate] are subjected to continuous melt extrusion by a double-screw extruder (with an extrusion temperature of 240° C. and a rotation speed of screws of 150 rpm) to prepare the composite.

Comparative Example 2

Referring to Example 1, a composite is prepared without the addition of a chain extender:
80 parts of PBT, 20 parts of an ethylene-vinyl acetate-glycidyl methacrylate copolymer and 0.3 parts of pentaerythritol tetrakis[β-(3,5-di-tert-butyl-4-hydroxyphenyl)propionate] were premixed uniformly at a room temperature to obtain a premix, then the premix was added into a conveying section of a double-screw extruder through a main feeding port, and a composite was obtained by continuous melt extrusion (with an extrusion temperature of 240° C. and a rotation speed of screws of 150 rpm).

Comparative Example 3

Referring to Example 1, a composite is prepared by using an ethylene-vinyl acetate copolymer as an elastomer:
80 parts of PBT, 20 parts of an ethylene-vinyl acetate copolymer and 0.3 parts of pentaerythritol tetrakis[β-(3,5-di-tert-butyl-4-hydroxyphenyl)propionate] were premixed uniformly at a room temperature to obtain a premix, then the premix was added into a conveying section of a double-screw extruder through a main feeding port, and 1 part of a chain extender ADR4370 (BASF Joncryl® ADR4370) was added into the middle of a meshing section of the double-screw extruder through side feeding, and a composite was obtained by continuous melt extrusion (with an extrusion temperature of 240° C. and a rotation speed of screws of 150 rpm).

Comparative Example 4

Referring to Example 1, a composite is prepared with one-time mixing:
80 parts of PBT, 20 parts of an ethylene-vinyl acetate-glycidyl methacrylate copolymer, 0.3 parts of pentaerythritol tetrakis[β-(3,5-di-tert-butyl-4-hydroxyphenyl)propionate] and 1 part of a chain extender ADR4370 (BASF Joncryl® ADR4370) were premixed uniformly at a room temperature to obtain a premix, then the premix was added into a conveying section of a double-screw extruder through a main feeding port, and a composite was obtained by continuous melt extrusion (with an extrusion temperature of 240° C. and a rotation speed of screws of 150 rpm).

Comparative Example 5

Referring to the formulation components of the composite in Example 1, a composite is prepared through a method of firstly using a chain extender for chain extension and then adding an elastomer:
80 parts of PBT, 1 part of a chain extender ADR4370 (BASF Joncryl® ADR4370) and 0.3 parts of pentaerythritol tetrakis[β-(3,5-di-tert-butyl-4-hydroxyphenyl)propionate] were premixed uniformly at a room temperature to obtain a premix, then the premix was added into a conveying section of a double-screw extruder through a main feeding port, and 20 parts of an ethylene-vinyl acetate-glycidyl methacrylate copolymer were added into the middle of a meshing section of the double-screw extruder through side feeding, and a composite was obtained by continuous melt extrusion (with an extrusion temperature of 240° C. and a rotation speed of screws of 150 rpm).

The composites obtained by extrusion in Examples 1-3 and Comparative Examples 1-5 above are subjected to injection on an injection molding machine to form standard sample bars for tensile and impact property testing, and test results are shown in Table 1 (aging for 0 h). The composites obtained in Examples 4-6 are thermoformed by a plate vulcanizer and cut into standard sample bars according to relevant standards for tensile and impact property testing, and test results are shown in Table 1 (aging for 0 h). The sample bars of Examples and Comparative Examples are subjected to constant temperature and humidity aging experiments in an environmental aging chamber under the condition of 70° C./80% RH, a batch of samples are taken out at regular intervals (24 h, 48 h, 72 h and 96 h), tensile property and impact property of the samples are measured, the hydrolysis resistance of the composites is evaluated, and test results are shown in Table 1.

TABLE 1

Composite Property Measurement

| Example | Aging for 0 h | Aging for 24 h | Aging for 48 h | Aging for 72 h | Aging for 96 h |
|---|---|---|---|---|---|
| Example 1 | 38, 480, 90 | 38, 420, 87 | 36, 380, 83 | 32, 210, 71 | 24, 86, 46 |
| Example 2 | 40, 460, 86 | 39, 430, 85 | 37, 350, 81 | 25, 93, 39 | 15, 45, 16 |
| Example 3 | 34, 375, 95 | 33, 340, 93 | 31, 295, 88 | 19, 102, 42 | 11, 23, 9 |
| Example 4 | 41, 320, 75 | 39, 280, 72 | 36, 234, 65 | 35, 200, 54 | 21, 97, 32 |
| Example 5 | 35, 430, 88 | 34, 413, 84 | 32, 384, 72 | 28, 280, 65 | 16, 113, 28 |
| Example 6 | 36, 345, 72 | 35, 310, 70 | 33, 242, 67 | 29, 175, 57 | 18, 69, 29 |
| Comparative Example 1 | 50, 8, 3 | 30, 5, 2 | 13, 2, 1 | — | — |
| Comparative Example 2 | 34, 180, 61 | 25, 78, 32 | 14, 25, 8 | — | — |
| Comparative Example 3 | 36, 22, 5 | 35, 18, 4 | 33, 15, 4 | 19, 9, 2 | 10, 4, 1 |
| Comparative Example 4 | 36, 51, 12 | 36, 44, 11 | 34, 38, 9 | 23, 18, 5 | 11, 8, 2 |
| Comparative Example 5 | 36, 26, 7 | 35, 21, 6 | 34, 18, 4 | 21, 10, 2 | 11, 5, 1 |

Note:
Three numbers in each grid in the table represent, from left to right, values of tensile strength, elongation at break and notched impact strength with units of MPa, % and $kJ/m^2$ respectively.

Tensile properties (tensile strength and elongation at break) of the composites obtained in Examples and Comparative Examples are tested according to the GB/T 1040-1992 standard at a tensile rate of 50 mm/min; and notched impact strength is tested according to the GB/T 1043-1993 standard with a notch depth of 2 mm. All mechanical properties are measured after the samples are stood for 24 hours in an environment of 23° C. The ethylene-vinyl acetate-glycidyl methacrylate copolymer used is supplied by Lanxess Energizing Chemistry Co., Ltd. and other chemicals are common commercial products.

As can be seen from the data in Table 1 (aging for 0 h), the pure PBT (Comparative Example 1) is very brittle; and the toughness of the composite with the addition of the ethylene-vinyl acetate-glycidyl methacrylate copolymer alone (Comparative Example 2) is significantly improved, but still far inferior to those of the composites of the present disclosure (as in Example 1). Compared with the pure PBT and the composite in Comparative Example 2, the elongation at break of the present disclosure is improved by 59.0 times and 1.7 times respectively, and the notched impact strength is improved by 28.0 times and 0.5 times respectively. It is because according to preparation methods of the present disclosure, a polyester matrix and a functionalized elastomer fully react with each other to realize in-situ reaction compatibilization, and then a proper quantity of chain extender is added to improve the molecular weight of polyester, so that the viscosity of the matrix is improved, the phase morphology of a blend is changed from an original sea-island structure to a quasi-bicontinuous structure, and the toughening effect of the elastomer on the polyester matrix is further improved. In addition, due to the significant increase of the molecular weight of the polyester matrix, the tensile strength of the obtained composites is also significantly higher than that of the composite in Comparative Example 2. However, if no functional group on the elastomer reacts with the polyester to produce a compatibilization function, no effective toughening effect can be achieved even if a chain extender is subsequently added (as Comparative Example 3). While the polyester, the elastomer and the chain extender are simultaneously added into a main feeding port of the extruder for blending, the toughness of the obtained composite (Comparative Example 4) is also far inferior to that of the present disclosure (as Example 1). Because the reaction of the functionalized elastomer and the polyester and the reaction of the chain extender and the polyester compete, the chain extender with the smaller molecular weight and more functional groups can preferentially react with the polyester, the steric hindrance of the reaction is increased, the elastomer is difficult to react with the polyester again, and a good compatibilization effect cannot be achieved. In addition, the toughness of the composite obtained by firstly adding the chain extender for chain extension and then adding the elastomer (Comparative Example 5) is also poor. It can be seen that there is a synergistic effect between the in-situ compatibilization caused by the full reaction of the functionalized elastomer and the polyester and the chain extension function of the chain extender on the toughening of the polyester. It can also be seen from Examples 1 and 6 that, as the functionalized elastomer, the ethylene-vinyl acetate-glycidyl methacrylate copolymer has a better toughening effect than the ethylene-n-butyl acrylate-glycidyl methacrylate copolymer.

As can be seen from the data in Table 1, the hydrolysis resistance of the pure PBT (Comparative Example 1) and the composite with only the ethylene-vinyl acetate-glycidyl methacrylate copolymer (Comparative Example 2) is very poor, and the mechanical properties are decreased significantly after aging for 24 h, while the hydrolysis resistance of the composites of the present disclosure is excellent and the mechanical properties are decreased significantly only after aging for 72 h or 96 h. The existence of end carboxyl groups and end hydroxyl groups can promote the hydrolysis of the polyester, while a large quantity of the end carboxyl groups and the end hydroxyl groups are consumed by the reactions of the functionalized elastomer and the chain extender with the polyester end group, so that the hydrolysis resistance of the composites is significantly improved.

Therefore, the polyester composites obtained by the present disclosure not only have excellent toughness, but also can maintain higher tensile strength and excellent hydrolysis resistance, and can be widely applied to the fields of plastic structural parts, plastic packages, automobile interior parts and the like.

Example 7

80 parts of PBT, 0.4 parts of epoxidized multi-wall carbon nanotubes and 0.3 parts of pentaerythritol tetrakis[β-(3,5- di-tert-butyl-4-hydroxyphenyl)propionate] were premixed uniformly at a room temperature to obtain a premix, then the premix was added to a conveying section of a double-screw extruder through a main feeding port, 20 parts of an ethylene-vinyl acetate-glycidyl methacrylate copolymer were added into the double-screw extruder for melt blending through first side feeding, then 1 part of a chain extender ADR4370 was added into the double-screw extruder through second side feeding, and a polyester composite was obtained through continuous melt extrusion (with an extrusion temperature of 240° C. and a rotation speed of screws of 150 rpm).

Example 8

80 parts of PBT, 0.3 parts of epoxidized multi-wall carbon nanotubes, 0.2 parts of tris[2,4-di-tert-butylphenyl]phosphite and 0.2 parts of n-octadecanol β-(3,5-di-tert-butyl-4-hydroxyphenyl)propionate were premixed uniformly at a room temperature to obtain a premix, then the premix was added to a conveying section of a double-screw extruder through a main feeding port, 20 parts of an ethylene-vinyl acetate-glycidyl methacrylate copolymer were added into the double-screw extruder for melt blending through first side feeding, then 0.8 part of a chain extender ADR4468 was added into the double-screw extruder through second side feeding, and a polyester composite was obtained through continuous melt extrusion (with an extrusion temperature of 255° C. and a rotation speed of screws of 180 rpm).

Example 9

75 parts of PBT, 0.3 parts of epoxidized graphene, 0.15 parts of pentaerythritol tetrakis[β-(3,5-di-tert-butyl-4-hydroxyphenyl)propionate], 0.15 parts of tris[2,4-di-tert-butylphenyl]phosphite, 0.1 parts of solid paraffin were premixed uniformly at a room temperature to obtain a premix, then the premix was added to a conveying section of a double-screw extruder through a main feeding port, 8 parts of an ethylene-vinyl acetate-glycidyl methacrylate copolymer and 17 parts of an ethylene-vinyl acetate biopolymer were added into the double-screw extruder for melt blending through first side feeding, then 1.2 part of a chain extender of hexamethylene diisocyanate was added into the double-screw extruder through second side feeding, and a polyester composite was obtained through continuous melt extrusion (with an extrusion temperature of 235° C. and a rotation speed of screws of 210 rpm).

Example 10

85 parts of PET, 0.5 parts of epoxidized multi-wall carbon nanotubes, 0.2 parts of pentaerythritol tetrakis[β-(3,5-di-tert-butyl-4-hydroxyphenyl)propionate], 0.1 parts of polyethylene wax and 0.3 parts of sodium benzoate were added into an internal mixer for melt blending for 2 minutes, then 15 parts of an ethylene-vinyl acetate-glycidyl methacrylate copolymer was added for continuing to blend for 3 minutes, and finally 1.3 parts of a chain extender of pyromellitic dianhydride were added for continuing to blend for 2 minutes (with a blending temperature of 260° C.) to obtain a polyester composite.

Example 11

70 parts of PET, 0.6 parts of epoxidized multi-wall carbon nanotubes, 0.2 parts of pentaerythritol tetrakis[β-(3,5-di-tert-butyl-4-hydroxyphenyl)propionate], 0.2 parts of tris[2,4-di-tert-butylphenyl]phosphite and 0.2 parts of sodium dihydrogen phosphate were added into an internal mixer for melt blending for 1 minutes, then 10 parts of an ethylene-vinyl acetate-glycidyl methacrylate copolymer and 20 parts of an ethylene-vinyl acetate biopolymer were added for continuing to blend for 4 minutes, and finally 0.8 parts of a chain extender ADR4370 was added for continuing to blend for 2 minutes (with a blending temperature of 250° C.) to obtain a polyester composite.

Example 12

75 parts of PBT, 0.35 parts of epoxidized carbon black, 0.4 parts of tris[2,4-di-tert-butylphenyl]phosphite, 0.2 parts of stearamide and 0.3 parts of magnesium stearate are added into an internal mixer for melt blending for 1.5 minutes, then 25 parts of an ethylene-vinyl acetate-glycidyl methacrylate copolymer are added for continuing to blend for 3 minutes, and finally, 0.7 parts of a chain extender ADR4468 are added for continuing to blend for 1.5 minutes (with a blending temperature of 240° C.) to obtain a polyester composite.

Comparative Example 6

Referring to Example 7, a polyester composite is prepared by using an ethylene-vinyl acetate copolymer as an elastomer:
80 parts of PBT, 0.4 parts of epoxidized multi-wall carbon nanotubes and 0.3 parts of pentaerythritol tetrakis[β-(3,5-di-tert-butyl-4-hydroxyphenyl)propionate] were premixed uniformly at a room temperature to obtain a premix, then the premix was added to a conveying section of a double-screw extruder through a main feeding port, 20 parts of an ethylene-vinyl acetate biopolymer were added into the double-screw extruder for melt blending through first side feeding, then 1 part of a chain extender ADR4370 was added into the double-screw extruder through second side feeding, and a polyester composite was obtained through continuous melt extrusion (with an extrusion temperature of 240° C. and a rotation speed of screws of 150 rpm).

Comparative Example 7

Referring to Example 7, a polyester composite is prepared without addition of epoxidized carbon-based particles:
80 parts of PBT and 0.3 parts of pentaerythritol tetrakis [β-(3,5-di-tert-butyl-4-hydroxyphenyl)propionate] were premixed uniformly at a room temperature to obtain a premix, then the premix was added to a conveying section of a double-screw extruder through a main feeding port, 20 parts of an ethylene-vinyl acetate-glycidyl methacrylate copolymer were added into the double-screw extruder for melt blending through first side feeding, then 1 part of a chain extender ADR4370 was added into the double-screw extruder through second side feeding, and a polyester composite was obtained through continuous melt extrusion (with an extrusion temperature of 240° C. and a rotation speed of screws of 150 rpm).

Comparative Example 8

Referring to Example 7, a polyester composite is prepared without addition of a chain extender:
80 parts of PBT, 0.4 parts of epoxidized multi-wall carbon nanotubes and 0.3 parts of pentaerythritol tetrakis[β-(3,5-di-tert-butyl-4-hydroxyphenyl)propionate] were premixed uniformly at a room temperature to obtain a premix, then the premix was added to a conveying section of a double-screw extruder through a main feeding port, 20 parts of an ethylene-vinyl acetate-glycidyl methacrylate copolymer were added into the double-screw extruder for melt blending through first side feeding, and a polyester composite was obtained through continuous melt extrusion (with an extrusion temperature of 240° C. and a rotation speed of screws of 150 rpm).

Comparative Example 9

Referring to Example 7, a polyester composite is prepared by adding both epoxidized carbon-based particles and an elastomer:

80 parts of PBT, 0.4 parts of epoxidized multi-wall carbon nanotubes, 20 parts of an ethylene-vinyl acetate-glycidyl methacrylate copolymer and 0.3 parts of pentaerythritol tetrakis[β-(3,5-di-tert-butyl-4-hydroxyphenyl)propionate] were premixed uniformly at a room temperature to obtain a premix, then the premix was added to a conveying section of a double-screw extruder through a main feeding port, then 1 part of a chain extender ADR4370 was added into the double-screw extruder through second side feeding, and a polyester composite was obtained through continuous melt extrusion (with an extrusion temperature of 240° C. and a rotation speed of screws of 150 rpm).

The polyester composites obtained by extrusion in Examples 7-9 and Comparative Examples 6-9 above are subjected to injection on an injection molding machine to obtain standard sample bars for tensile, impact and conductivity property testing, and test results are shown in Table 2. The composites obtained in Example 10-12 are thermoformed by a plate vulcanizer and cut into standard sample bars according to relevant standards for tensile, impact and conductivity property testing, and test results are shown in Table 2. The sample bars of Examples and Comparative Examples are subjected to constant temperature and humidity aging experiments in an environmental aging chamber under the condition of 70° C./80% RH, the sample bars are taken out after 48 h, tensile property and impact property of the sample bars are measured, the hydrolysis resistance of the polyester composites is evaluated, and test results are shown in Table 2.

Tensile properties (tensile strength and elongation at break) of the polyester composites obtained in Examples and Comparative Examples are tested according to the GB/T 1040-1992 standard at a tensile rate of 50 mm/min; and notched impact strength is tested according to the GB/T 1043-1993 standard with a notch depth of 2 mm. All mechanical properties are measured after the sample bars are stood for 24 hours in an environment of 23° C. The conductivity of the polyester composites is measured by a four-probe conductivity meter. The ethylene-vinyl acetate-glycidyl methacrylate copolymer used is supplied by Lanxess Energizing Chemistry Co., Ltd. and other chemicals are common commercial products.

As can be seen from the data in Table 2, the pure PBT (Comparative Example 1) is very brittle and very low in conductivity; the toughness of the polyester composite with only the ethylene-vinyl acetate-glycidyl methacrylate copolymer and the chain extender (Comparative Example 7) is significantly improved, but the conductivity is still very low. If the elastomer of the ethylene-vinyl acetate-glycidyl methacrylate copolymer of the present disclosure is replaced with the ethylene-vinyl acetate copolymer (Comparative Example 6), the compatibility between two phases is very poor because there is no interfacial reaction between the elastomer and a polyester matrix, and the particle size and particle spacing of the elastomer are large, so that the toughness and conductivity of the polyester composite are far inferior to those of the polyester composites of the present disclosure (as Example 7). If no chain extender is added into the polyester composite (Comparative Example 8), the basic viscosity of a matrix is not high during melt blending and the particle size and particle spacing of elastomer particles cannot be further reduced, so the mechanical properties and conductivity of the polyester composite of Comparative Example 8 are also significantly inferior to those of the present disclosure. According to the polyester composite obtained by blending the epoxidized carbon-based particles and the elastomer into polyester at the same time (Comparative Example 9), since the carbon-based particles cannot be selectively distributed in a polyester matrix, a conductive network is difficult to form, and therefore the conductivity of the polyester composite of Comparative Example 9 is also far inferior to that of the present disclosure. Compared with the pure PBT (Comparative Example 1), the elongation at break and the notched impact strength of the present disclosure (as Example 7) are improved by 62.8 times and 29.7 times respectively, the

TABLE 2

Polyester Composite Property Measurement

| Example | Tensile Strength (MPa) | Elongation at Break (%) | Notched Impact Strength (kJ/m$^2$) | Conductivity (S/cm) | Tensile Strength after Aging for 48 h (MPa) | Elongation at Break after Aging for 48 h (%) | Notched Impact Strength after Aging for 48 h (kJ/m$^2$) |
|---|---|---|---|---|---|---|---|
| Example 7 | 42 | 510 | 92 | $2.5 \times 10^{-9}$ | 39 | 425 | 84 |
| Example 8 | 43 | 468 | 88 | $8.5 \times 10^{-10}$ | 38 | 362 | 83 |
| Example 9 | 39 | 490 | 94 | $1.8 \times 10^{-9}$ | 36 | 402 | 90 |
| Example 10 | 43 | 331 | 78 | $5.3 \times 10^{-9}$ | 39 | 286 | 70 |
| Example 11 | 31 | 374 | 93 | $1.5 \times 10^{-7}$ | 30 | 323 | 89 |
| Example 12 | 39 | 422 | 90 | $5.8 \times 10^{-9}$ | 35 | 355 | 84 |
| Comparative Example 1 | 50 | 8 | 3 | $2.3 \times 10^{-17}$ | 13 | 2 | 1 |
| Comparative Example 6 | 39 | 25 | 7 | $7.5 \times 10^{-13}$ | 34 | 17 | 5 |
| Comparative Example 7 | 37 | 410 | 85 | $2.6 \times 10^{-17}$ | 35 | 332 | 79 |
| Comparative Example 8 | 38 | 170 | 63 | $1.5 \times 10^{-13}$ | 15 | 22 | 7 |
| Comparative Example 9 | 39 | 385 | 82 | $7.9 \times 10^{-15}$ | 37 | 314 | 75 | conductivity is improved by 8 orders of magnitude, and an original insulating material is converted into an antistatic material. In addition, due to the fact that the chain extender enables the molecular weight of the polyester matrix to be significantly increased, and the reinforcing effect of the carbon-based particles is added, the polyester composites of the present disclosure can still maintain higher tensile strength.

As can be seen from the data in Table 2, the hydrolysis resistance of the pure PBT (Comparative Example 1) is very poor, and the mechanical properties are decreased significantly after aging for 48 h; the hydrolysis resistance of the polyester composites of the present disclosure (as Example 7) is excellent and the mechanical properties are decreased slightly after aging for 48 h. The existence of end carboxyl groups and end hydroxyl groups can promote the hydrolysis of polyester, while a large quantity of the end carboxyl groups and the end hydroxyl groups are consumed by the reactions of the epoxidized carbon-based particles, the functionalized elastomer and the chain extender with polyester end groups, so that the hydrolysis resistance of the polyester is significantly improved.

Therefore, the polyester composites obtained by the present disclosure not only have excellent mechanical properties, but also can obtain an antistatic property under the condition of a very low addition quantity of conductive carbon-based particles, have excellent hydrolysis resistance, and can be widely applied to the fields of plastic structural parts, electric appliance housings and the like.

Example 13

80 parts of PBT and 20 parts of a vinyl acetate-based copolymer (with content of vinyl acetate of 60% by mass and content of glycidyl methacrylate of 3.1% by mass) were premixed uniformly at a room temperature to obtain a premix, and then the premix was subjected to continuous melt extrusion by a double-screw extruder (with an extrusion temperature of 240° C., and a rotation speed of screws of 150 rpm) to obtain a PBT composite.

Example 14

75 parts of PBT, 8 parts of a vinyl acetate-based copolymer (with content of vinyl acetate of 50% by mass and content of glycidyl methacrylate of 5% by mass), 17 parts of an ethylene-vinyl acetate copolymer (with content of vinyl acetate of 50% by mass), 0.2 parts of n-octadecanol β-(3,5-di-tert-butyl-4-hydroxyphenyl)propionate and 0.1 parts of pentaerythritol stearate were premixed uniformly at a room temperature to obtain a premix, and then the premix was subjected to continuous melt extrusion by a double-screw extruder (with an extrusion temperature of 235° C., and a rotation speed of screws of 180 rpm) to obtain a PBT composite.

Example 15

80 parts of PBT, 5 parts of a vinyl acetate-based copolymer (with content of vinyl acetate of 60% by mass and content of glycidyl methacrylate of 3.1% by mass), 15 parts of an ethylene-vinyl acetate copolymer (with content of vinyl acetate of 50% by mass), 0.5 parts of pentaerythritol tetrakis[β-(3,5-di-tert-butyl-4-hydroxyphenyl)propionate] were premixed uniformly at a room temperature to obtain a premix, and then the premix was added into an internal mixer for melt blending for 8 minutes (with a blending temperature of 230° C.) to prepare a composite.

Example 16

85 parts of PBT, 15 parts of a vinyl acetate-based copolymer (with content of vinyl acetate of 60% by mass and content of glycidyl methacrylate of 3.1% by mass), 0.4 parts of tris[2,4-di-tert-butylphenyl]phosphite, 0.2 parts of stearamide and 1 part of sodium benzoate were premixed uniformly at a room temperature to obtain a premix, and then the premix was added into an internal mixer for melt blending for 5 minutes (with a blending temperature of 240° C.) to prepare a composite.

Comparative Example 10

100 parts of PBT were subjected to continuous melt extrusion by a double-screw extruder (with an extrusion temperature of 240° C., and a rotation speed of screws of 150 rpm) to obtain a PBT composite.

Comparative Example 11

80 parts of PBT and 20 parts of an ethylene-n-butyl acrylate-glycidyl methacrylate copolymer were premixed uniformly at a room temperature to obtain a premix, and then the premix was subjected to continuous melt extrusion by a double-screw extruder (with an extrusion temperature of 240° C., and a rotation speed of screws of 150 rpm) to obtain a composite.

The PBT composites obtained by extrusion in Examples 13-14 and Comparative Examples 10-11 above are fully dried, then subjected to melt index testing, and subjected to injection on an injection molding machine to form standard sample bars for tensile and impact property testing, and test results are shown in Table 3. The PBT composites obtained in Example 15-16 are subjected to melt index testing, thermoformed by a plate vulcanizer and cut into standard sample bars according to relevant standards for tensile and impact property testing, and test results are shown in Table 3.

TABLE 3

| Property Testing on PBT Composites Obtained in Examples 12-16 and Comparative Examples 10-11 | | | | |
|---|---|---|---|---|
| Example | Tensile Strength (MPa) | Elongation at Break (%) | Notched Impact Strength (KJ/m$^2$) | Melt Index (g/10 min) |
| Example 13 | 34 | 180 | 61 | 5.3 |
| Example 14 | 31 | 160 | 70 | 4.8 |
| Example 15 | 33 | 155 | 62 | 5.9 |
| Example 16 | 37 | 130 | 50 | 7.8 |
| Comparative Example 10 | 50 | 8 | 3.1 | 33.2 |
| Comparative Example 11 | 32 | 80 | 30 | 7.4 |

Example 17

80 parts of PBT, 20 parts of a vinyl acetate-based copolymer (with content of vinyl acetate of 60% by mass and content of glycidyl methacrylate of 3.1% by mass) and 2 parts of zinc oxide (with a particle size of 30 nm) were premixed uniformly at a room temperature to obtain a premix, then the premix was added into a conveying section of a double-screw extruder through a main feeding port, 0.75 parts of a chain extender ADR4370 were added into the middle of a meshing section of the double-screw extruder through side feeding, and a composite was obtained by continuous melt extrusion (with an extrusion temperature of 240° C. and a rotation speed of screws of 150 rpm).

Example 18

80 parts of PBT, 20 parts of a vinyl acetate-based copolymer (with content of vinyl acetate of 60% by mass and content of glycidyl methacrylate of 3.1% by mass) and 4 parts of zinc oxide (with a particle size of 50 nm) were premixed uniformly at a room temperature to obtain a premix, then the premix was added into a conveying section of a double-screw extruder through a main feeding port, 1.2 parts of a chain extender ADR4370 were added into the middle of a meshing section of the double-screw extruder through side feeding, and a composite was obtained by continuous melt extrusion (with an extrusion temperature of 235° C. and a rotation speed of screws of 150 rpm).

Example 19

70 parts of PBT, 10 parts of a vinyl acetate-based copolymer (with content of vinyl acetate of 60% by mass and content of glycidyl methacrylate of 3.1% by mass), 20 parts of an ethylene-vinyl acetate copolymer (with content of vinyl acetate of 60% by mass), 2.5 parts of titanium dioxide (with a particle size of 100 nm), 0.3 parts of pentaerythritol tetrakis[β-(3,5-di-tert-butyl-4-hydroxyphenyl)propionate], 0.1 parts of polyethylene wax and 1 part of talc were premixed uniformly at a room temperature to obtain a premix, then the premix was added into a conveying section of a double-screw extruder through a main feeding port, 1.5 parts of a chain extender SAG-008 (Fine-Blend™ SAG-008) were added into the middle of a meshing section of the double-screw extruder through side feeding, and a composite was obtained by continuous melt extrusion (with an extrusion temperature of 245° C. and a rotation speed of screws of 200 rpm).

Example 20

75 parts of PBT, 5 parts of a vinyl acetate-based copolymer (with content of vinyl acetate of 60% by mass and content of glycidyl methacrylate of 3.1% by mass), 20 parts of an ethylene-vinyl acetate copolymer (with content of vinyl acetate of 60% by mass), 1 part of silver oxide (with a particle size of 20 nm) were premixed uniformly at a room temperature to obtain a premix, then the premix was added into an internal mixer for melt blending for 3 minutes, and then 0.5 parts of a chain extender ADR4468 were added for continuing to blend for 2 minutes (with a blending temperature of 235° C.) to obtain a composite.

Example 21

85 parts of PBT, 15 parts of a vinyl acetate-based copolymer (with content of vinyl acetate of 50% by mass and content of glycidyl methacrylate of 5% by mass), 3 parts of cerium oxide (with a particle size of 60 nm), 0.25 parts of tris[2,4-di-tert-butylphenyl]phosphite, and 2.5 parts of sodium benzoate were premixed uniformly at a room temperature to obtain a premix, then the premix was added into an internal mixer for melt blending for 2.5 minutes, and then 0.5 parts of a chain extender of hexamethylene diisocyanate were added for continuing to blend for 2.5 minutes (with a blending temperature of 235° C.) to obtain a composite.

Comparative Example 12

100 parts of PBT and 2 parts of zinc oxide (with a particle size of 30 nm) were premixed uniformly at a room temperature to obtain a premix, then the premix was added into a conveying section of a double-screw extruder through a main feeding port, and 0.75 part of a chain extender ADR4370 (BASF Joncryl® ADR4370) was added into the middle of a meshing section of the double-screw extruder through side feeding, and a composite was obtained by continuous melt extrusion (with an extrusion temperature of 240° C. and a rotation speed of screws of 150 rpm).

Comparative Example 13

80 parts of PBT, 20 parts of a vinyl acetate-based copolymer (with content of vinyl acetate of 60% by mass and content of glycidyl methacrylate of 3.1% by mass), and 2 parts of zinc oxide (with a particle size of 30 nm) were premixed uniformly at a room temperature to obtain a premix, then the premix was added into a conveying section of a double-screw extruder through a main feeding port, and a composite was obtained by continuous melt extrusion (with an extrusion temperature of 240° C. and a rotation speed of screws of 150 rpm).

Comparative Example 14

80 parts of PBT, 20 parts of a vinyl acetate-based copolymer (with content of vinyl acetate of 60% by mass and content of glycidyl methacrylate of 3.1% by mass), 2 parts of zinc oxide (with a particle size of 30 nm) and 0.75 part of a chain extender ADR4370 (BASF Joncryl® ADR4370) were premixed uniformly at a room temperature to obtain a premix, then the premix was added into a conveying section of a double-screw extruder through a main feeding port, and a composite was obtained by continuous melt extrusion (with an extrusion temperature of 240° C. and a rotation speed of screws of 150 rpm).

The PBT composites obtained by extrusion in Examples 17-19 and Comparative Examples 12-14 above are fully dried, then subjected to melt index testing, and subjected to injection on an injection molding machine to form standard sample bars for tensile and impact property testing, an antibacterial rate of the composites is tested by *Escherichia coli* and *Staphylococcus aureus* bacteriostasis experiments, and test results are shown in Table 4. The PBT composites obtained in Examples 20-21 are subjected to melt index testing, thermoformed by a plate vulcanizer and cut into standard sample bars according to relevant standards for tensile and impact property testing, an antibacterial rate of the composites is tested by *Escherichia coli* and *Staphylococcus aureus* bacteriostasis experiments, and test results are shown in Table 4.

TABLE 4

Property Testing on PBT Composites Obtained in
Examples 17-21 and Comparative Examples 12-14

| Example | Tensile Strength (MPa) | Elongation at Break (%) | Notched Impact Strength (KJ/m$^2$) | Melt Index (g/10 min) | Antibacterial rate of *Escherichia coli* (%) | Antibacterial rate of *Staphylococcus aureus* (%) |
| --- | --- | --- | --- | --- | --- | --- |
| Example 17 | 36 | 55 | 42 | 6.5 | 98.5 | 99.3 |
| Example 18 | 35 | 45 | 38 | 7.0 | 99.3 | 100 |
| Example 19 | 30 | 50 | 46 | 5.5 | 98.9 | 99.3 |
| Example 20 | 33 | 52 | 45 | 6.1 | 97.4 | 99.0 |
| Example 21 | 39 | 37 | 28 | 8.8 | 98.5 | 99.2 |
| Comparative Example 10 | 50 | 8 | 3.1 | 33.2 | 0 | 0 |
| Comparative Example 12 | 49 | 5 | 2.8 | 10.7 | 98.4 | 99.2 |
| Comparative Example 13 | 32 | 10 | 3.4 | 22.7 | 98.6 | 99.2 |
| Comparative Example 14 | 33 | 16 | 12 | 7.2 | 98.5 | 99.1 |

Tensile properties (tensile strength and elongation at break) of the composites in Examples and Comparative Examples are tested according to the GB/T 1040-1992 standard at a tensile rate of 50 mm/min; and notched impact strength is tested according to the GB/T 1043-1993 standard with a notch depth of 2 mm. All mechanical properties are measured after samples are stood for 24 hours in an environment of 23° C. The melt index is measured under standard conditions of 250° C. and 2.16 kg. The antibacterial rate of the composites is determined by a plate counting method (J. Food Sci. 2012, 77, 280-286). The vinyl acetate-based copolymer used is supplied by Lanxess Energizing Chemistry Co., Ltd. and other chemicals are common commercial products.

As can be seen from the data in Table 3, compared with the pure PBT (Comparative Example 10), the elongation at break and notched impact strength of the PBT modified with the vinyl acetate-based copolymer (as Example 13) are improved by 21.5 times and 18.7 times respectively, while the melt index is significantly reduced. It is because a comb-shaped hyperbranched structure is formed in situ by the reaction of the vinyl acetate-based copolymer with the PBT, the compatibility of the two components is significantly improved, the toughness and melt viscosity of the PBT are improved, and the modification effect is obviously better than that of a traditional toughening agent of the ethylene-n-butyl acrylate-glycidyl methacrylate copolymer on the PBT (Comparative Example 11).

As can be seen from the data in Table 4, the pure PBT is very brittle (Comparative Example 10) and the toughness of the composite with the zinc oxide and the vinyl acetate-based copolymer is also relatively poor (Comparative Example 13) because the zinc oxide induces thermal degradation of a PBT matrix. The addition of the chain extender can make up for the degradation of the PBT, but the toughness of the composite after adding the chain extender, the zinc oxide and the vinyl acetate-based copolymer at the same time is not significantly improved (Comparative Example 14). It is because the chain extender can preferentially react with end carboxyl groups or end hydroxyl groups of the PBT, and the reaction degree of the vinyl acetate-based copolymer and the PBT is greatly reduced. According to the present disclosure, the chain extender is added from a side feeding port of the double-screw extruder, so that not only is full reaction between the vinyl acetate-based copolymer and the end groups of the PBT ensured, but also the catalytic degradation of the zinc oxide on the PBT is compensated through the subsequent chain extension effect, so that the prepared composites are excellent in toughness. However, if the vinyl acetate-based copolymer is not added (Comparative Example 12), the obtained composite is also very brittle. Therefore, the PBT composites obtained by the present disclosure not only have excellent toughness, but also have excellent antibacterial capability, and can be widely applied to the fields of antibacterial fibers and fabrics, plastic packaging materials, automobile interior parts, medical consumables and the like.

Example 22

80 parts of recycled polyethylene terephthalate (with intrinsic viscosity of 0.7 dL/g), and 20 parts of an ethylene-vinyl acetate-glycidyl methacrylate copolymer (with content of vinyl acetate of 60% by mass and content of glycidyl methacrylate of 3% by mass) were premixed uniformly at a room temperature to obtain a premix, and then the premix is subjected to continuous melt extrusion by a double-screw extruder (with an extrusion temperature of 260° C. and a rotation speed of screws of 150 rpm) to obtain a composite.

Example 23

85 parts of recycled polyethylene terephthalate (with intrinsic viscosity of 0.7 dL/g), 15 parts of an ethylene-vinyl acetate-glycidyl methacrylate copolymer (with content of vinyl acetate of 60% by mass and content of glycidyl methacrylate of 3% by mass), 0.4 parts of tris[2,4-di-tert-butylphenyl]phosphite, 0.2 parts of stearamide, and 1 part of sodium benzoate were added into an internal mixer for melt blending for 5 minutes (with a blending temperature of 265° C.) so as to obtain a composite.

Example 24

80 parts of recycled polyethylene terephthalate (with intrinsic viscosity of 0.65 dL/g), 20 parts of an ethylene-vinyl acetate-glycidyl methacrylate copolymer (with content of vinyl acetate of 70% by mass and content of glycidyl methacrylate of 2% by mass) and 0.5 parts of pentaerythritol tetrakis[β-(3,5-di-tert-butyl-4-hydroxyphenyl)propionate]

were added into an internal mixer for melt blending for 8 minutes (with a blending temperature of 250° C.) so as to obtain a composite.

Example 25

75 parts of recycled polyethylene terephthalate (with intrinsic viscosity of 0.6 dL/g), 25 parts of an ethylene-vinyl acetate-glycidyl methacrylate copolymer (with content of vinyl acetate of 50% by mass and content of glycidyl methacrylate of 5% by mass), 0.2 parts of n-octadecanol β-(3,5-di-tert-butyl-4-hydroxyphenyl)propionate and 0.1 parts of pentaerythritol stearate were premixed uniformly at a room temperature to obtain a premix, and then the premix is subjected to continuous melt extrusion by a double-screw extruder (with an extrusion temperature of 255° C. and a rotation speed of screws of 180 rpm) to obtain a composite.

Comparative Example 15

100 parts of recycled polyethylene terephthalate (with intrinsic viscosity of 0.7 dL/g) were subjected to melt extrusion by a double-screw extruder (with an extrusion temperature of 260° C. and a rotation speed of screws of 150 rpm) to obtain a composite.

Comparative Example 16

100 parts of recycled polyethylene terephthalate (with intrinsic viscosity of 0.7 dL/g) and 20 parts of an ethylene-n-butyl acrylate-glycidyl methacrylate copolymer (with content of n-butyl acrylate of 60% by mass and content of glycidyl methacrylate of 3% by mass) were subjected to melt extrusion by a double-screw extruder (with an extrusion temperature of 260° C. and a rotation speed of screws of 150 rpm) to obtain a composite.

Comparative Example 17

80 parts of newly-synthesized polyethylene terephthalate (with intrinsic viscosity of 0.95 dL/g) and 20 parts of an ethylene-vinyl acetate-glycidyl methacrylate copolymer (with content of vinyl acetate of 60% by mass and content of glycidyl methacrylate of 3% by mass) were premixed uniformly at a room temperature to obtain a premix, and then the premix is subjected to continuous melt extrusion by a double-screw extruder (with an extrusion temperature of 260° C. and a rotation speed of screws of 150 rpm) to obtain a composite.

The polyethylene terephthalate composites obtained in Examples 22 and 25 and Comparative Examples 15-17 are fully dried, subjected to melt index testing, and subjected to injection on an injection molding machine to form standard sample bars for tensile and impact property testing, and test results are shown in Table 5. The tough polyethylene terephthalate composites obtained in Examples 23 and 24 are fully dried, subjected to melt index testing, thermoformed by a plate vulcanizer and cut into standard sample bars according to relevant standards for tensile and impact property testing, and test results are shown in Table 5.

TABLE 5

Property Testing on PET Composites Obtained in Examples 22-25 and Comparative Examples 15-17

| Example | Tensile Strength (MPa) | Elongation at Break (%) | Notched Impact Strength (KJ/m$^2$) | Melt Index (g/10 min) |
|---|---|---|---|---|
| Example 22 | 50 | 460 | 75 | 5.1 |
| Example 23 | 45 | 320 | 46 | 8.5 |
| Example 24 | 48 | 400 | 65 | 7.5 |
| Example 25 | 39 | 410 | 82 | 2.3 |
| Comparative Example 15 | 55 | 7 | 3.3 | 35 |
| Comparative Example 16 | 35 | 250 | 45 | 9.5 |
| Comparative Example 17 | 35 | 50 | 18 | 26 |

Example 26

80 parts of recycled PET, 20 parts of an ethylene-vinyl acetate-glycidyl methacrylate copolymer (with content of vinyl acetate of 60% by mass and content of glycidyl methacrylate of 3% by mass) and 2 parts of nano zinc oxide (with a particle size of 30 nm) were premixed uniformly at a room temperature to obtain a premix, then the premix was added into a conveying section of a double-screw extruder through a main feeding port, 0.75 parts of a chain extender ADR4370 were added in the middle of a meshing section of the double-screw extruder through side feeding, and a tough PET antibacterial composite was obtained through continuous melt extrusion (with an extrusion temperature of 260° C. and a rotation speed of screws of 150 rpm).

The tough PET antibacterial composite obtained by extrusion is fully dried, then subjected to melt index testing, and subjected to injection on an injection molding machine to form standard sample bars for tensile and impact property testing, an antibacterial rate of the composite is tested by *Escherichia coli* and *Staphylococcus aureus* bacteriostasis experiments, and test results are shown in Table 6.

Example 27

85 parts of recycled PET, 15 parts of an ethylene-vinyl acetate-glycidyl methacrylate copolymer (with content of vinyl acetate of 70% by mass and content of glycidyl methacrylate of 2% by mass) and 1 parts of nano zinc oxide (with a particle size of 20 nm) were added into an internal mixer for melt blending for 3 minutes, and then 0.5 parts of a chain extender ADR4468 were added for continuing to blend for 2 minutes (with a blending temperature of 250° C.) to obtain a tough PET antibacterial composite.

The above tough PET antibacterial composite is subjected to melt index testing, thermoformed by a plate vulcanizer and cut into standard sample bars according to relevant standards for tensile and impact property testing, an antibacterial rate of the composite is tested by *Escherichia coli* and *Staphylococcus aureus* bacteriostasis experiments, and test results are shown in Table 6.

Example 28

70 parts of recycled PET, 30 parts of an ethylene-vinyl acetate-glycidyl methacrylate copolymer (with content of vinyl acetate of 60% by mass and content of glycidyl methacrylate of 3% by mass), 2.5 parts of nano zinc oxide (with a particle size of 100 nm), 0.3 parts of pentaerythritol tetrakis[β-(3,5-di-tert-butyl-4-hydroxyphenyl)propionate], 0.1 parts of polyethylene wax and 1 part of talc were premixed uniformly at a room temperature to obtain a premix, then the premix was added into a conveying section of a double-screw extruder through a main feeding port, 1.5 parts of a chain extender SAG-008 were added in the middle of a meshing section of the double-screw extruder through side feeding, and a tough PET antibacterial composite was obtained through continuous melt extrusion (with an extrusion temperature of 265° C. and a rotation speed of screws of 200 rpm).

A tough PET antibacterial composite obtained by extrusion is fully dried, then subjected to melt index testing, and subjected to injection on an injection molding machine to form standard sample bars for tensile and impact property testing, an antibacterial rate of the composite is tested by *Escherichia coli* and *Staphylococcus aureus* bacteriostasis experiments, and test results are shown in Table 6.

Example 29

80 parts of newly-synthesized PET, 20 parts of an ethylene-vinyl acetate-glycidyl methacrylate copolymer (with content of vinyl acetate of 60% by mass and content of glycidyl methacrylate of 3% by mass), and 2 parts of nano zinc oxide (with a particle size of 30 nm) were premixed uniformly at a room temperature to obtain a premix, then the premix was added into a conveying section of a double-screw extruder through a main feeding port, 0.75 parts of a chain extender ADR4370 were added in the middle of a meshing section of the double-screw extruder through side feeding, and a tough PET antibacterial composite was obtained through continuous melt extrusion (with an extrusion temperature of 260° C. and a rotation speed of screws of 150 rpm).

A tough PET antibacterial composite obtained by extrusion is fully dried, then subjected to melt index testing, and subjected to injection on an injection molding machine to form standard sample bars for tensile and impact property testing, an antibacterial rate of the composite is tested by *Escherichia coli* and *Staphylococcus aureus* bacteriostasis experiments, and test results are shown in Table 6.

Example 30

85 parts of newly-synthesized PET, 15 parts of an ethylene-vinyl acetate-glycidyl methacrylate copolymer (with content of vinyl acetate of 50% by mass and content of glycidyl methacrylate of 5% by mass), 2 parts of nano zinc oxide (with a particle size of 60 nm), 0.25 parts of tris[2,4-di-tert-butylphenyl]phosphite and 2.5 parts of sodium benzoate were added into an internal mixer for melt blending for 2.5 minutes, and then 0.5 parts of a chain extender of hexamethylene diisocyanate were added for continuing to blend for 2.5 minutes (with a blending temperature of 255° C.) to obtain a tough PET antibacterial composite.

The above tough PET antibacterial composite is subjected to melt index testing, thermoformed by a plate vulcanizer and cut into standard sample bars according to relevant standards for tensile and impact property testing, an antibacterial rate of the composite is tested by *Escherichia coli* and *Staphylococcus aureus* bacteriostasis experiments, and test results are shown in Table 6.

Comparative Example 18

100 parts of recycled PET were subjected to continuous melt extrusion by a double-screw extruder (with an extrusion temperature of 260° C. and a rotation speed of screws of 150 rpm) to obtain a PET composite, the PET composite was fully dried, then subjected to melt index testing, and subjected to injection on an injection molding machine to form standard sample bars for tensile and impact property testing, an antibacterial rate of the composite was tested by *Escherichia coli* and *Staphylococcus aureus* bacteriostasis experiments, and test results were shown in Table 6.

Comparative Example 19

100 parts of recycled PET and 2 parts of nano zinc oxide (with a particle size of 30 nm) were premixed uniformly at a room temperature to obtain a premix, then the premix was added into a conveying section of a double-screw extruder through a main feeding port, 0.75 parts of a chain extender ADR4370 were added into the middle of a meshing section of the double-screw extruder through side feeding, and a PET antibacterial composite was obtained through continuous melt extrusion (with an extrusion temperature of 260° C. and a rotation speed of screws of 150 rpm).

The tough PET antibacterial composite obtained by extrusion is fully dried, then subjected to melt index testing, and subjected to injection on an injection molding machine to form standard sample bars for tensile and impact property testing, an antibacterial rate of the composite is tested by *Escherichia coli* and *Staphylococcus aureus* bacteriostasis experiments, and test results are shown in Table 6.

Comparative Example 20

Referring to Example 26, no chain extender is added:
80 parts of recycled PET, 20 parts of an ethylene-vinyl acetate-glycidyl methacrylate copolymer (with content of vinyl acetate of 60% by mass and content of glycidyl methacrylate of 3% by mass) and 2 parts of nano zinc oxide (with a particle size of 30 nm) were premixed uniformly at a room temperature to obtain a premix, then the premix was added into a conveying section of a double-screw extruder through a main feeding port, and a tough PET antibacterial composite was obtained through continuous melt extrusion (with an extrusion temperature of 260° C. and a rotation speed of screws of 150 rpm).

The tough PET antibacterial composite obtained by extrusion is fully dried, then subjected to melt index testing, and subjected to injection on an injection molding machine to form standard sample bars for tensile and impact property testing, an antibacterial rate of the composite is tested by *Escherichia coli* and *Staphylococcus aureus* bacteriostasis experiments, and test results are shown in Table 6.

Comparative Example 21

Referring to Example 26, a chain extender is added at one time:
80 parts of recycled PET, 20 parts of an ethylene-vinyl acetate-glycidyl methacrylate copolymer (with content of vinyl acetate of 60% by mass and content of glycidyl methacrylate of 3% by mass), 2 parts of nano zinc oxide (with a particle size of 30 nm) and 0.75 parts of a chain extender ADR4370 were premixed uniformly at a room temperature to obtain a premix, then the premix was added into a conveying section of a double-screw extruder through a main feeding port, and a tough PET antibacterial composite was obtained through continuous melt extrusion (with an extrusion temperature of 260° C. and a rotation speed of screws of 150 rpm).

The tough PET antibacterial composite obtained by extrusion is fully dried, then subjected to melt index testing, and subjected to injection on an injection molding machine to form standard sample bars for tensile and impact property testing, an antibacterial rate of the composite is tested by *Escherichia coli* and *Staphylococcus aureus* bacteriostasis experiments, and test results are shown in Table 6.

Comparative Example 22

Referring to Example 29, no elastomer or chain extender is added:

100 parts of newly-synthesized PET and 2 parts of nano zinc oxide (with a particle size of 30 nm) were premixed uniformly at a room temperature to obtain a premix, then the premix was added into a conveying section of a double-screw extruder through a main feeding port, and a tough PET antibacterial composite was obtained through continuous melt extrusion (with an extrusion temperature of 260° C. and a rotation speed of screws of 150 rpm).

A tough PET antibacterial composite obtained by extrusion is fully dried, then subjected to melt index testing, and subjected to injection on an injection molding machine to form standard sample bars for tensile and impact property testing, an antibacterial rate of the composite is tested by *Escherichia coli* and *Staphylococcus aureus* bacteriostasis experiments, and test results are shown in Table 6.

Comparative Example 23

Referring to Example 29, no nano zinc oxide is added:

80 parts of newly-synthesized PET and 20 parts of an ethylene-vinyl acetate-glycidyl methacrylate copolymer (with content of vinyl acetate of 60% by mass and content of glycidyl methacrylate of 3% by mass) were premixed uniformly at a room temperature to obtain a premix, then the premix was added into a conveying section of a double-screw extruder through a main feeding port, 0.75 parts of a chain extender ADR4370 were added in the middle of a meshing section of the double-screw extruder through side feeding, and a tough PET antibacterial composite was obtained through continuous melt extrusion (with an extrusion temperature of 260° C. and a rotation speed of screws of 150 rpm).

A tough PET antibacterial composite obtained by extrusion is fully dried, then subjected to melt index testing, and subjected to injection on an injection molding machine to form standard sample bars for tensile and impact property testing, an antibacterial rate of the composite is tested by *Escherichia coli* and *Staphylococcus aureus* bacteriostasis experiments, and test results are shown in Table 6.

TABLE 6

Property Testing on PET Composites Obtained in Examples 26-30 and Comparative Examples 18-23

| Example | Tensile Strength (MPa) | Elongation at Break (%) | Notched Impact Strength (KJ/m$^2$) | Melt Index (g/10 min) | Antibacterial rate of *Escherichia coli* (%) | Antibacterial rate of *Staphylococcus aureus* (%) |
|---|---|---|---|---|---|---|
| Example 26 | 38 | 60 | 40 | 5.5 | 98.5 | 99.2 |
| Example 27 | 42 | 55 | 38 | 9 | 97.4 | 98.9 |
| Example 28 | 35 | 50 | 42 | 3.8 | 98.9 | 99.3 |
| Example 29 | 39 | 45 | 35 | 5.8 | 98.5 | 99.2 |
| Example 30 | 43 | 39 | 25 | 8.5 | 98.3 | 99.1 |
| Comparative Example 18 | 55 | 7 | 3.3 | 35 | 0 | 0 |
| Comparative Example 19 | 52 | 4 | 2.8 | 10 | 98.5 | 99.2 |
| Comparative Example 20 | 34 | 9 | 3.5 | 23 | 98.4 | 99.2 |
| Comparative Example 21 | 35 | 18 | 23 | 6.5 | 98.5 | 99.2 |
| Comparative Example 22 | 46 | 2 | 1.5 | 53 | 98.4 | 99.2 |
| Comparative Example 23 | 35 | 45 | 19 | 6.1 | 0 | 0 |

Example 31

80 parts of polyethylene terephthalate (with intrinsic viscosity of 0.7 dL/g), 20 parts of an ethylene-vinyl acetate-glycidyl methacrylate copolymer (with content of vinyl acetate of 60% by mass and content of glycidyl methacrylate of 3% by mass) and 2 parts of epoxidized nano zinc oxide (with a particle size of 30 nm) were premixed uniformly at a room temperature, and then melt extrusion was performed by a double-screw extruder (with an extrusion temperature of 260° C. and a rotation speed of screws of 150 rpm) to obtain a composite.

A preparation method of the epoxidized nano zinc oxide includes: nano zinc oxide, ethanol, water and KH560 are subjected to high-speed stirring treatment according to a weight ratio of 95:2:1:2 for 8 minutes to obtain the epoxidized nano zinc oxide, wherein a grafting rate of the KH560 is 0.8%.

Example 32

80 parts of polyethylene terephthalate (with intrinsic viscosity of 0.9 dL/g), 20 parts of an ethylene-vinyl acetate-glycidyl methacrylate copolymer (with content of vinyl acetate of 50% by mass and content of glycidyl methacrylate of 4% by mass) and 3 parts of epoxidized nano zinc oxide (with a particle size of 20 nm) were premixed uniformly at a room temperature, and then melt extrusion was performed by a double-screw extruder (with an extrusion temperature of 240° C. and a rotation speed of screws of 150 rpm) to obtain a composite.

A preparation method of epoxidized nano zinc oxide includes: nano zinc oxide, methanol, water and KH560 are subjected to high-speed stirring treatment according to a weight ratio of 80:1.5:1.5:1 for 6 minutes to obtain the epoxidized nano zinc oxide, wherein a grafting rate of the KH560 is 0.6%.

Example 33

70 parts of polyethylene terephthalate (with intrinsic viscosity of 0.85 dL/g), 30 parts of an ethylene-vinyl acetate-glycidyl methacrylate copolymer (with content of vinyl acetate of 50% by mass and content of glycidyl methacrylate of 4% by mass), 2.5 parts of epoxidized nano zinc oxide (with a particle size of 100 nm), 0.3 parts of pentaerythritol tetrakis[β-(3,5-di-tert-butyl-4-hydroxyphenyl)propionate], 0.1 parts of polyethylene wax and 1 part of talc were premixed uniformly at a room temperature, and then melt extrusion was performed by a double-screw extruder (with an extrusion temperature of 265° C. and a rotation speed of screws of 200 rpm) to obtain a composite.

The preparation method of epoxidized nano zinc oxide was the same as Example 31.

Example 34

85 parts of polycarbonate (with intrinsic viscosity of 1.5 dL/g), 15 parts of an ethylene-vinyl acetate-glycidyl methacrylate copolymer (with content of vinyl acetate of 70% by mass and content of glycidyl methacrylate of 2% by mass), 1 parts of epoxidized nano zinc oxide (with a particle size of 20 nm) were used as the component instead, and the components are added into an internal mixer for melt blending for 4 minutes (with a blending temperature of 250° C.) to obtain a composite.

A preparation method of epoxidized nano zinc oxide includes: nano zinc oxide, ethanol, water and KH560 are mixed according to a weight ratio of 8:72:4:4, react for 16 hours at 40° C. and are purified to obtain the epoxidized nano zinc oxide, wherein a grafting rate of the KH560 is 1.3%.

Example 35

75 parts of polyethylene terephthalate (with intrinsic viscosity of 0.65 dL/g), 25 parts of an ethylene-vinyl acetate-glycidyl methacrylate copolymer (with content of vinyl acetate of 60% by mass and content of glycidyl methacrylate of 3% by mass), 1.5 parts of epoxidized nano zinc oxide (with a particle size of 20 nm), 0.4 parts of pentaerythritol tetrakis[β-(3,5-di-tert-butyl-4-hydroxyphenyl)propionate], 0.2 parts of stearamide and 1 part of sodium benzoate were used as the component instead, and the components are added into an internal mixer for melt blending for 5 minutes (with a blending temperature of 250° C.) to obtain a composite.

A preparation method of epoxidized nano zinc oxide includes: nano zinc oxide, ethanol, water and KH560 are mixed according to a weight ratio of 8:80:6:6, react for 10 hours at 50° C. and are purified to obtain the epoxidized nano zinc oxide, wherein a grafting rate of the KH560 is 1.7%.

Comparative Example 24

100 parts of polyethylene terephthalate (with intrinsic viscosity of 0.7 dL/g) were subjected to melt extrusion by a double-screw extruder (with an extrusion temperature of 260° C. and a rotation speed of screws of 150 rpm) to obtain a composite.

Comparative Example 25

100 parts of polyethylene terephthalate (with intrinsic viscosity of 0.7 dL/g) and 2 parts of unmodified nano zinc oxide (with a particle size of 30 nm) were premixed uniformly at a room temperature, and then melt extrusion was performed by a double-screw extruder (with an extrusion temperature of 260° C. and a rotation speed of screws of 150 rpm) to obtain a composite.

Comparative Example 26

100 parts of polyethylene terephthalate (with intrinsic viscosity of 0.7 dL/g) and 2 parts of epoxidized nano zinc oxide (with a particle size of 30 nm) were premixed uniformly at a room temperature, and then melt extrusion was performed by a double-screw extruder (with an extrusion temperature of 260° C. and a rotation speed of screws of 150 rpm) to obtain a contact antibacterial polyester composite with excellent performance.

A preparation method of the epoxidized nano zinc oxide was the same as that in Example 31.

Comparative Example 27

80 parts of polyethylene terephthalate (with intrinsic viscosity of 0.7 dL/g), 20 parts of an ethylene-vinyl acetate-glycidyl methacrylate copolymer (with content of vinyl acetate of 60% by mass and content of glycidyl methacrylate of 3% by mass), 2 parts of unmodified nano zinc oxide (with a particle size of 30 nm) were used as the component instead, and the components are premixed uniformly at a room temperature, and melt extrusion is performed by a double-screw extruder (with an extrusion temperature of 260° C. and a rotation speed of screws of 150 rpm) to obtain a composite.

The polyester composites obtained by extrusion in Examples 31-33 and Comparative Examples 24-27 above are fully dried, then subjected to melt index testing, and subjected to injection on an injection molding machine to form standard sample bars for tensile and impact property testing, an antibacterial rate of the composites and a migration behavior of the nano zinc oxide are tested by *Escherichia coli* and *Staphylococcus aureus* bacteriostasis experiments and inhibition zone experiments, and test results are shown in Table 7. The polyester composites obtained in Examples 34-35 are subjected to melt index testing, thermoformed by a plate vulcanizer and cut into standard sample bars according to relevant standards for tensile and impact property testing, an antibacterial rate of the composites and a migration behavior of the nano zinc oxide are tested by *Escherichia coli* and *Staphylococcus aureus* bacteriostasis experiments and inhibition zone experiments, and test results are shown in Table 7.

TABLE 7

Property Results of Composites Obtained in Examples 31-35 and Comparative Examples 24-27

| Example | Tensile Strength (MPa) | Elongation at Break (%) | Notched Impact Strength (KJ/m$^2$) | Melt Index (g/10 min) | Antibacterial rate of *Escherichia coli* (%)/Inhibition Zone | Antibacterial rate of *Staphylococcus aureus* (%)/Inhibition Zone |
|---|---|---|---|---|---|---|
| Example 31 | 38.8 | 130 | 55 | 5.2 | 98.9/No | 99.3/No |
| Example 32 | 37.6 | 100 | 50 | 5.6 | 99.5/No | 99.7/No |
| Example 33 | 35.5 | 90 | 62 | 3.6 | 99.2/No | 99.5/No |
| Example 34 | 43.5 | 220 | 100 | 6.5 | 97.8/No | 99.0/No |
| Example 35 | 36.8 | 115 | 58 | 4.2 | 98.2/No | 99.1/No |
| Comparative Example 24 | 56.5 | 8 | 3.0 | 30 | 0/No | 0/No |
| Comparative Example 25 | 25.5 | 1 | 0.5 | >70 | 98.3/Yes | 99.2/Yes |
| Comparative Example 26 | 53.7 | 5 | 2.9 | 9.5 | 98.8/No | 99.3/No |
| Comparative Example 27 | 34.0 | 9 | 3.5 | 23 | 98.4/Yes | 99.2/Yes |

Tensile properties (tensile strength and elongation at break) of the composites in Examples and Comparative Examples are tested according to the GB/T 1040-1992 standard at a tensile rate of 50 mm/min. Notched impact strength is tested according to the GB/T 1043-1993 standard with a notch depth of 2 mm. All mechanical properties are measured after samples are stood for 24 hours in an environment of 23° C. The melt indexes of the polyethylene terephthalate, the polybutylene terephthalate and the polycarbonate are measured under standard conditions of 260° C./2.16 kg, 250° C./2.16 kg, and 300° C./1.2 kg respectively. A Kirby-Bauer test method (e.g., Am. J. Clin. Pathol. 1966, 45, 493-496.) is used in the inhibition zone experiments of the composites, and a plate counting method (J. Food Sci. 2012, 77, 280-286) is used in the antibacterial rate experiments of the composites. The polyethylene terephthalate used is supplied by Changzhou Huarun Composite Materials Co., Ltd., the polybutylene terephthalate used is supplied by Kanghui Petrochemical Co., Ltd., and the polycarbonate used is supplied by Taiwan Chimei Co., Ltd.; and the recycled polyethylene terephthalate is supplied by Zhejiang Jiali Regeneration Resource Co., Ltd., and other chemicals are commercial products.

As can be seen from the data in Table 5, compared with the pure recycled PET (Comparative Example 15), the elongation at break and the notched impact strength of the recycled PET modified with the vinyl acetate-based copolymer (as Example 22) are improved by 64.7 times and 21.7 times respectively, while the melt index is significantly reduced. It is because a comb-shaped hyperbranched structure is formed in situ by the reaction of the vinyl acetate-based copolymer and the recycled PET, the compatibility of the two components is significantly improved, the toughness and the melt viscosity of the recycled PET are improved, and the modification effect is obviously superior to that of a traditional toughening agent of the ethylene-n-butyl acrylate-glycidyl methacrylate copolymer (Comparative Example 16) on the PET. Compared with the newly-synthesized PET, the modification effect of the vinyl acetate-based copolymer disclosed in the present disclosure on the recycled PET is more significant, for example, the tensile strength, the elongation at break and the notched impact strength of the recycled PET modified with the vinyl acetate-based copolymer (as Example 22) are 1.43 times, 9.2 times and 4.2 times those of the newly-synthesized PET modified with the vinyl acetate-based copolymer (Comparative Example 17) respectively, while the melt index of the recycled PET modified with the vinyl acetate-based copolymer (as Example 22) is 18% of that of the newly-synthesized PET modified with the vinyl acetate-based copolymer (Comparative Example 17), which indicates that the recycled PET is easier to react with the vinyl acetate-based copolymer to form a comb-shaped hyperbranched copolymer. Therefore, the polyethylene terephthalate composites obtained by the present disclosure have the advantages of high tensile strength, high elongation at break, good impact toughness and the like, and are suitable for preparing daily articles and devices with high requirements for mechanical properties.

As can be seen from the data in Table 6, the PET (Comparative Example 18) is very brittle and the toughness of the composite with the nano zinc oxide and the vinyl acetate-based copolymer (Comparative Example 20) is also relatively poor because the nano zinc oxide induces thermal degradation of a PET matrix. The addition of the chain extender can make up for the degradation of the PET, but the toughness of the composite after adding the chain extender, the nano zinc oxide and the vinyl acetate-based copolymer (Comparative Example 21) at the same time is not significantly improved because the chain extender can preferentially react with carboxyl end groups or end hydroxyl groups of the PET, so the reaction degree of the vinyl acetate-based copolymer and the PET is weakened. According to the present disclosure, the chain extender is added from the side feeding port of the double-screw extruder, so that not only is full reaction between the vinyl acetate-based copolymer and the end groups of the PET ensured, but also the catalytic degradation of the nano zinc oxide to the recycled PET is compensated through the subsequent chain extension effect, and therefore the toughness of the prepared composites is excellent. Compared with Comparative Examples 22-23, the nano zinc oxide, the vinyl acetate-based copolymer and the chain extender in the composites disclosed by the present disclosure also have a synergistic effect in improving the toughness of the newly-synthesized PET composite. Firstly, the nano zinc oxide can catalyze thermal degradation of the newly-synthesized PET to generate more active end groups. Compared with the newly-synthesized PET, the nano zinc oxide can react with epoxy groups on the vinyl acetate-based copolymer more easily to form a comb-shaped hyperbranched copolymer in situ. The comb-shaped hyperbranched copolymer can significantly improve the compatibility and melt viscosity of the vinyl acetate-based copolymer and the PET matrix. Meanwhile, the chain extender added through the side feeding port makes up for excessive thermal degradation of the nano zinc oxide to the PET. Therefore, the obtained PET composites of the present disclosure not only have excellent toughness, but also have excellent antibacterial capability, and can be widely applied to the fields of antibacterial fibers and fabrics, plastic packaging materials, automobile interior parts, medical consumables and the like.

As can be seen from the data in Table 7, both the PET (Comparative Example 24) and the composites with only the epoxidized nano zinc oxide or the unmodified nano zinc oxide (Comparative Examples 25-26) are very brittle, but the toughness and strength of the composites with the epoxidized nano zinc oxide are significantly superior to those of the composites with the unmodified nano zinc oxide. The toughness of the composite with the nano zinc oxide and the vinyl acetate-based copolymer (Comparative Example 27) is also relatively poor because the nano zinc oxide induces degradation of the PET polyester matrix to result in embrittlement of the composite. According to the composites disclosed by the present disclosure, the epoxy groups on the surface of the epoxidized nano zinc oxide react with the end carboxyl groups or the end hydroxyl groups of the polyester in situ, so that the degradation of the polyester is well compensated, and the toughness of the composites is excellent. The comb-shaped hyperbranched copolymer is formed by in-situ reaction of the vinyl acetate-based copolymer and the polyester, the compatibility and the melt viscosity of the vinyl acetate-based copolymer and the polyester matrix can be remarkably improved, and the polyester is endowed with excellent toughness. The composites disclosed by the present disclosure have no inhibition zone because the epoxidized nano zinc oxide is connected with the polyester matrix through a chemical bond and cannot migrate out of the matrix. Meanwhile, the nano zinc oxide is more uniformly dispersed after being subjected to epoxidation modification, so that the antibacterial rate of the composites is higher. It is worthy to illustrate that the zinc oxide catalyzes the moderate degradation of the polyester to generate more hydroxyl and carboxyl end groups, which can improve the reaction degree of the polyester with the epoxy groups and the vinyl acetate-based copolymer and benefit improvement of the properties of the polyester composites, namely, the epoxidized nano zinc oxide and the vinyl acetate-based copolymer in the present disclosure have a synergistic effect in improving the properties of the polyester composites. Therefore, the polyester composites obtained by the present disclosure not only have excellent performance, but also have excellent antibacterial capability, an antibacterial agent cannot migrate to the outside of the matrix, and the polyester composites can be widely applied to the fields of fibers and fabrics, plastic packaging materials, automobile interior parts, medical consumables and the like.

What is claimed is:

1. A polyester composite, comprising, in parts by weight:
65 to 90 parts of polyester,
5 to 35 parts of an elastomer,
0.05 to 3 parts of a chain extender, and
0.01 to 5 parts of a functional additive,
wherein a preparation method of the polyester composite comprises steps performed in order, as follows:
i) uniformly mixing the polyester, the elastomer, and the functional additive according to a weight ratio;
ii) performing melt extrusion or melt blending,
iii) adding the chain extender according to a weight ratio, and
iv) performing continuous melt extrusion or melt blending to obtain the polyester composite;
wherein in step iv) elastomer structures are changed from a disperse "sea-island" phase to a quasi-continuous phase to form a quasi-bicontinuous structure as a result of the continuous metl extrusion or melt blending,
wherein the chain extender is added after melt extrusion or melt blending of polyester and elastomer,
wherein the elastomer comprises epoxy groups or anhydride groups and comprises structural units of vinyl acetate, and
wherein the functional additive is at least one of an antibiotic, an antistatic agent, a lubricant, a nucleating agent, an anti-hydrolysis agent, and a transesterification inhibitor.

2. The polyester composite according to claim 1, wherein the polyester composite comprises one or more of poly (ethylene terephthalate) (PET), poly(butylene terephthalate) (PBT), and polycarbonate (PC).

3. The polyester composite according to claim 1, wherein:
the polyester is poly(butylene terephthalate) (PBT);
the polyester composite comprises, in parts by weight:
65 to 90 parts of the PBT,
5 to 35 parts of the elastomer,
0.05 to 3 parts of the chain extender, and
0.1 to 4 parts of the functional additive, wherein the functional additive is the antibacterial agent; and
the antibacterial agent comprises one or more of zinc oxide, silver oxide, titanium dioxide, and cerium oxide.

4. The polyester composite according to claim 1, wherein:
the polyester is poly(butylene terephthalate) (PBT);
the polyester composite comprises, in parts by weight:
65 to 90 parts of the PBT,
0 to 4 parts of the functional additive, wherein the functional additive is the antibacterial agent and
0.05 to 3 parts of the chain extender;
the antibacterial agent comprises one or more of zinc oxide, silver oxide, titanium dioxide and cerium oxide.

5. The polyester composite according to claim 1, wherein the structural units of vinyl acetate comprises glycidyl methacrylate and an ethylene structural unit.

6. The polyester composite according to claim 1, wherein the structural units of vinyl acetate comprises one or more of an ethylene-vinyl acetate copolymer, an ethylene-vinyl acetate methacrylate copolymer, and an ethylene-vinyl acetate biopolymer.

7. The polyester composite according to claim 4,
wherein the polyester is PBT,
wherein the polyester composite comprises, in parts by weight:
65 to 90 parts of the PBT,
0.1 to 4 parts of the antibacterial agent, and
0.05 to 3 parts of the chain extender.

8. The polyester composite according to claim 1, wherein:
the polyester is poly(butylene terephthalate) (PBT);
the polyester composite comprises, in parts by weight:
65 to 90 parts of the PBT,
5 to 35 parts of the vinyl acetate-based copolymer,
0.1 to 5 parts of epoxidized carbon-based particles,
0.05 to 3 parts of the chain extender, and 0.01 to 5 parts of the functional additive; and the preparation method of the polyester composite further comprises:

adding the vinyl acetate-based copolymer according to a weight ratio and performing a second instance of continuous melt extrusion or melt blending after step ii) and prior to step iii).

9. The polyester composite according to claim 1, wherein:

the polyester is poly(butylene terephthalate) (PBT);

the polyester composite comprises, in parts by weight:

2 65 to 90 parts of the PBT, 5 to 35 parts of the vinyl acetate-based copolymer, 0.05 to 3 parts of s-the chain extender, and 0.1 to 4 parts of epoxidized nano zinc oxide; and wherein the PBT is uniformly premixed together with the vinyl acetate-based copolymer, and the nano zinc oxide according to a weight ratio in step i).

10. A polyester composite, comprising, in parts by weight:

70 to 95 parts of PET, 0.1 to 4 parts of epoxidized nano zinc oxide or 0.1 to 4 parts of nano zinc oxide, 0.05 to 3 parts of a chain extender, and 5 to 30 parts of a vinyl acetate-based copolymer, wherein:

intrinsic viscosity of the PET is 0.3 to 1.0 dL/g, and a content of vinyl acetate in the vinyl acetate-based copolymer is 45 to 75% by mass;

the vinyl acetate-based copolymer at least further comprises glycidyl methacrylate and an ethylene structural unit, and a content of the glycidyl methacrylate is 0.5 to 10% by mass, and a preparation method of the polyester composite comprises steps performed in order, as follows:

i) uniformly premixing the PET, the vinyl acetate-based copolymer, and the nano zinc oxide according to a weight ratio at a room temperature to obtain a premix, ii) adding the premix into a conveying section of a double-screw extruder through a main feeding port, iii) adding the chain extender into the middle of a meshing section of the double-screw extruder through side feeding according to a weight ratio, and iii) performing continuous melt extrusion to obtain a PET composite, and a melt extrusion temperature is 1 to 30° C. above a melting point of the PET, and a rotation speed of screws is 100 rpm to 350 rpm.

11. A plastic package, an automobile interior part, an electric appliance housing or an antibacterial fiber comprising the polyester composite according to claim 1.

12. The polyester composite according to claim 1, wherein the chain extender consists of a compound containing a plurality of isocyanate groups or an anhydride compound.

13. The polyester composite according to claim 1, wherein the chain extender comprises ADR 4370.

14. The polyester composite according to claim 1, wherein:

the antioxidant is at least one of pentaerythritol tetrakis [β-(3,5-di-tert-butyl-4-hydroxyphenyl)propionate], tris [2,4-di-tert-butylphenyl]phosphite, and n-octadecanol β-(3,5-di-tert-butyl-4-hydroxyphenyl)propionate, the lubricant is at least one of solid paraffin, liquid paraffin, polyethylene wax, stearamide, methylene bis stearamide, N,N-ethylene bis stearamide and pentaerythritol stearate, the nucleating agent is at least one of talc, magnesium stearate, sodium benzoate and Surlyn 8920, the anti-hydrolysis agent is N,N'-di(2,6-diisopropylphenyl)carbodiimide, or the transesterification inhibitor is at least one of sodium dihydrogen phosphate, triphenyl phosphite and disodium dihydrogen pyrophosphate.

15. The polyester composite according to claim 10, wherein the chain extender consists of a compound containing a plurality of isocyanate groups or an anhydride compound.

16. The polyester composite according to claim 10, wherein the chain extender comprises ADR 4370.

17. The polyester composite according to claim 10, wherein:

the antioxidant is at least one of pentaerythritol tetrakis [β-(3,5-di-tert-butyl-4-hydroxyphenyl)propionate], tris [2,4-di-tert-butylphenyl]phosphite, and n-octadecanol β-(3,5-di-tert-butyl-4-hydroxyphenyl)propionate, the lubricant is at least one of solid paraffin, liquid paraffin, polyethylene wax, stearamide, methylene bis stearamide, N,N-ethylene bis stearamide and pentaerythritol stearate, the nucleating agent is at least one of talc, magnesium stearate, sodium benzoate and Surlyn 8920, the anti-hydrolysis agent is N,N'-di(2,6-diisopropylphenyl)carbodiimide, or the transesterification inhibitor is at least one of sodium dihydrogen phosphate, triphenyl phosphite and disodium dihydrogen pyrophosphate.

\* \* \* \* \*